US011263616B2

(12) United States Patent
Tada et al.

(10) Patent No.: US 11,263,616 B2
(45) Date of Patent: Mar. 1, 2022

(54) INFORMATION PROCESSING METHOD, INFORMATION PROCESSING APPARATUS, AND PROGRAM

(71) Applicant: Mercari, Inc., Tokyo (JP)

(72) Inventors: Megumi Tada, Tokyo (JP); Masataka Nakajima, Tokyo (JP); Hiroaki Tanaka, Tokyo (JP); Kentaro Kumagai, Tokyo (JP)

(73) Assignee: Mercari, Inc., Tokyo (JP)

( * ) Notice: Subject to any disclaimer, the term of this patent is extended or adjusted under 35 U.S.C. 154(b) by 0 days.

(21) Appl. No.: 16/700,278

(22) Filed: Dec. 2, 2019

(65) Prior Publication Data

US 2020/0193409 A1 Jun. 18, 2020

(30) Foreign Application Priority Data

Dec. 18, 2018 (JP) .............................. JP2018236792

(51) Int. Cl.
*G06Q 20/24* (2012.01)
*G06Q 30/06* (2012.01)
*G06Q 20/16* (2012.01)
*G06Q 20/10* (2012.01)
*G06Q 20/12* (2012.01)

(52) U.S. Cl.
CPC ............ *G06Q 20/24* (2013.01); *G06Q 20/10* (2013.01); *G06Q 20/12* (2013.01); *G06Q 20/16* (2013.01); *G06Q 30/0627* (2013.01)

(58) Field of Classification Search
CPC ........ G06Q 20/10; G06Q 20/12; G06Q 20/16; G06Q 20/24; G06Q 30/0627

USPC ....................................................... 705/3–44
See application file for complete search history.

(56) References Cited

U.S. PATENT DOCUMENTS

| 6,950,807 B2 * | 9/2005 | Brock .................. G06Q 10/087 705/38 |
| 7,523,067 B1 * | 4/2009 | Nakajima .............. G06Q 20/10 705/39 |

(Continued)

FOREIGN PATENT DOCUMENTS

| JP | 2002-352170 A | 12/2002 |
| JP | 2018-120619 A | 8/2018 |

OTHER PUBLICATIONS

"Competition and efficient usage of payment cards", OECD Journal of Competition Law and Policy 11.3: 7, 9-65, 67-99. Organisation for Economic Cooperation and Development (OECD), Proquest Document Id: 894123992. (Year: 2011).*

*Primary Examiner* — Frantzy Poinvil
(74) *Attorney, Agent, or Firm* — Sterne, Kessler, Goldstein & Fox P.L.L.C.

(57) ABSTRACT

An information processing method executed by one or more processors included in an information processing apparatus. The method includes obtaining a notice indicating that a deferred payment has been selected for a settlement of a price of a product on a website; identifying a seller to which the settlement is to be made; receiving a request for settlement on an amount of money determined based on information including information on delivery of the product and information on the price of the product; and advancing the settlement in a case where the amount of money is less than or equal to an upper limit of an amount of settlement using the deferred payment allowed for a user.

12 Claims, 15 Drawing Sheets

(56) References Cited

U.S. PATENT DOCUMENTS

| | | | | |
|---|---|---|---|---|
| 7,742,983 B2* | 6/2010 | Ukigawa | .............. | G06Q 20/102 |
| | | | | 705/39 |
| 8,126,794 B2* | 2/2012 | Lange | .................... | G06Q 30/08 |
| | | | | 705/36 R |
| 8,346,660 B2* | 1/2013 | Reardon | ................ | G06Q 40/04 |
| | | | | 705/39 |
| 2003/0126072 A1* | 7/2003 | Brock | .................. | G06Q 40/025 |
| | | | | 705/38 |
| 2006/0064376 A1* | 3/2006 | Ukigawa | ................ | G06Q 20/02 |
| | | | | 705/39 |
| 2007/0150387 A1* | 6/2007 | Seubert | .................. | G06Q 40/00 |
| | | | | 705/31 |
| 2008/0114684 A1* | 5/2008 | Foster | .................... | G06Q 30/06 |
| | | | | 705/51 |
| 2008/0294482 A1* | 11/2008 | Bank | ................ | G06Q 10/06311 |
| | | | | 705/7.13 |
| 2012/0215680 A1* | 8/2012 | Wasserman | ............ | G06Q 40/02 |
| | | | | 705/38 |
| 2013/0332318 A1* | 12/2013 | D'Auria | .............. | H04L 67/2838 |
| | | | | 705/27.1 |
| 2014/0006202 A1* | 1/2014 | Frohwein | ............. | G06Q 40/025 |
| | | | | 705/26.3 |
| 2014/0337170 A1* | 11/2014 | Hamdi | ............... | G06Q 30/0609 |
| | | | | 705/26.35 |
| 2015/0100491 A1 | 4/2015 | Fote | | |
| 2015/0310483 A1* | 10/2015 | Kent | .................. | G06Q 30/0246 |
| | | | | 705/14.45 |
| 2015/0363862 A1* | 12/2015 | Ranft | ................ | G06Q 30/0631 |
| | | | | 705/26.7 |

* cited by examiner

FIG.4

| USER ID | USER NAME | ADDRESS | BALANCE | | BORROWING LIMIT | BORROWING AMOUNT | POINTS | SETTLEMENT HISTORY | SETTLEMENT METHOD | ATTRIBUTES | | | |
|---|---|---|---|---|---|---|---|---|---|---|---|---|---|
| | | | HOLDING BALANCE (JP¥) | BORROWABLE BALANCE (JP¥) | | | | | | AGE | OCCUPATION | CREDIT LEVEL | |
| 001 | USER A | XX PREF., OO CITY | 200 | 10,000 | 10,000 | 0 | 100 | P SHOP | DEFERRED PAYMENT SERVICE | 21 | STUDENT | — | ... |
| ... | ... | ... | ... | ... | ... | ... | ... | ... | ... | ... | ... | ... | ... |

| SITE ID | URL | MEAN AMOUNT OF SETTLEMENTS | MEAN VALUE OF PRODUCT PRICES | MAXIMUM VALUE | MINIMUM VALUE | MEDIAN VALUE | CREDIT LEVEL | ... |
|---|---|---|---|---|---|---|---|---|
| EC01 | http://・・・・ | 2,000 | 500 | 10,000 | 100 | 2,500 | 5 | ... |
| ... | ... | ... | ... | ... | ... | ... | ... | ... |

3142

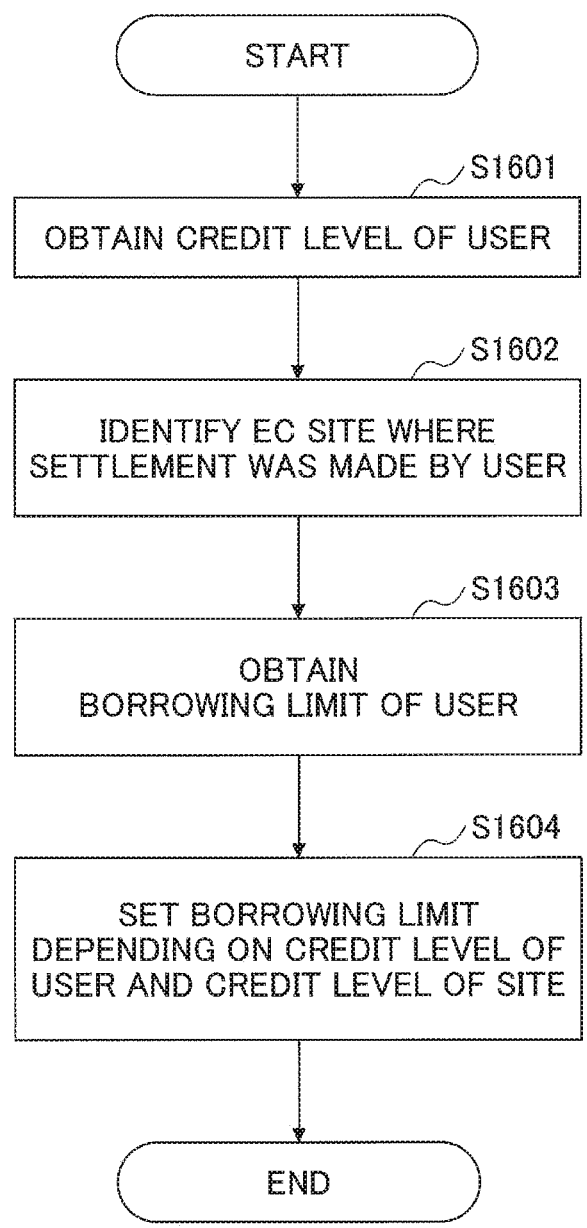

INFORMATION PROCESSING METHOD, INFORMATION PROCESSING APPARATUS, AND PROGRAM

The present application is based on and claims the benefit of priority of Japanese Priority Application No. 2018-236792, filed on Dec. 18, 2018, the entire contents of which are hereby incorporated by reference.

FIELD

The present disclosure relates to an information processing method, an information processing apparatus, and a program.

BACKGROUND

In recent years, various types of electronic commerce are carried out on the Internet. Patent Document 1 discloses a service of intermediating between a buyer and a seller that keeps the payment of a purchase of a product from the buyer, confirms that the product has been delivered to the buyer, and then, transfers the payment to the seller. Also, Patent Document 2 discloses that an intermediary agent pays to the payee through its server without disclosing to the payee the money source selected by the payer and the actual account selected by the payer.

PRIOR ART DOCUMENTS

Patent Documents

Patent Document 1: Japanese Laid-Open Patent Application No. 2002-352170
Patent Document 2: Japanese Laid-Open Patent Application No. 2018-120619

However, in such conventional techniques, the delivery charge of a product to be totaled with the price of the product is calculated after information representing the delivery destination of the product is entered at the sales site of the product. Therefore, the buyer will not know the amount of the delivery charge of the product until the buyer enters information representing the delivery destination of the product. Also, the conventional techniques do not take into account the credit level of the seller who sells the product.

It is an object of an embodiment in the disclosure to provide a technology that enables to enhance the convenience of the user upon purchasing a product and to set an appropriate upper limit of the amount of settlement.

SUMMARY

According to one embodiment in the present disclosure, an information processing method executed by one or more processors included in an information processing apparatus. The method includes obtaining a notice indicating that a deferred payment has been selected for a settlement of a price of a product on a website; identifying a seller to which the settlement is to be made; receiving a request for settlement on an amount of money determined based on information including information on delivery of the product and information on the price of the product; and advancing the settlement in a case where the amount of money is less than or equal to an upper limit of an amount of settlement using the deferred payment allowed for a user.

BRIEF DESCRIPTION OF DRAWINGS

FIG. 4 illustrates an example of a user information storage unit according to the first embodiment;

FIG. 15 is a diagram illustrating an example of a site information storage unit according to the second embodiment; and FIG. 16 illustrates a flow chart of steps of setting borrowing limits according to the second embodiment.

DESCRIPTION OF EMBODIMENTS

<Legal Compliance>

The disclosures described herein, when implemented, are made in compliance with the laws and regulations of the countries in which the disclosure is implemented. Also, the disclosures described herein are implemented with all changes, substitutions, variations, transformations, and modifications that may be made by a person skilled in the art necessary to comply with the laws and regulations of each country.

Embodiments for carrying out settlement according to the present disclosure will be described with reference to the drawings.

<System Configuration>

Figure 1:
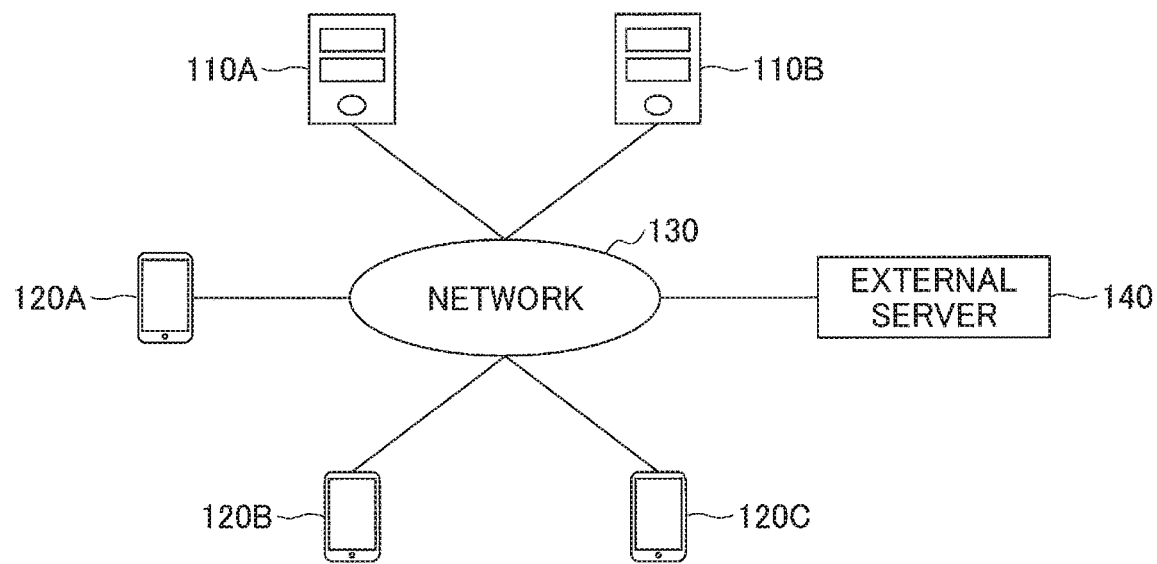
FIG. 1 illustrates a configuration of a communication system according to an aspect of embodiments.

FIG. 1 illustrates a configuration of a communication system 1 according to an embodiment in the present disclosure. As disclosed in FIG. 1, in the communication system 1, servers 110A and 110B; terminals 120A, 120B, and 120C; and an external server 140 are connected via a network 130.

In the present disclosure, in the case where it is not necessary to make a distinction between the server 110A and the server 110B, the server 110A and/or the server 110B may be referred to as the server(s) 110.

In the present disclosure, in the case where it is not necessary to make a distinction among the terminals 120A, 120B, and 120C, the terminals 120A, 120B, and/or 120C may be referred to as the terminal(s) 120.

In the present disclosure, in the case where it is not necessary to make a distinction between the server 110 and the terminal 120, the server 110 and/or the terminal 120 may be referred to as an information processing apparatus(es) 200. Note that the number of information processing apparatuses 200 connected to the network 130 is not limited in particular.

The server 110 provides predetermined services to the terminals 120 used by users via the network 130. The predetermined services include, but are not limited to, for example, settlement services, financial services, electronic commerce services, social networking services (SNS) represented by instant messengers, providing services of contents such as music, videos, books, and the like. When the users use the predetermined services via terminals 120, the server 110 can provide the predetermined services to the one or more terminals 120.

In the present disclosure, a settlement service means a service in which one or more users can exchange money or money equivalents. Settlement services include, but are not limited to, for example, services that use one-dimensional codes (e.g., bar codes), two-dimensional codes (e.g., QR codes (registered trademarks)) (collectively referred to as "two-dimensional codes and the like", below), and short-range wireless communication (Near Field Communication (NFC), Bluetooth (registered trademark) Low Energy (BLE), Wi-Fi (registered trademarks), ultrasound communication, infrared communication, etc.). Also, a settlement in which a user (payer) who pays a price on the terminal 120 by reading a two-dimensional code or the like to make the settlement will be referred to as "user-readable code settlement" or "MPM (Merchant Presented Mode)"; and a settlement in which a user (payer) who causes his/her terminal 120 to display a two-dimensional code or the like so that the displayed two-dimensional code or the like is read by a terminal 120 of another user (seller or requester) at a store side or the like who requests a payment of the price to the payer so as to make the settlement will be referred to as "store-readable code settlement" or "CPM (Consumer Presented Mode)". Note that MPM and CPM may be dynamic or static.

When necessary, a terminal used by a user X will be referred to as the terminal 120X, and user information in a predetermined service associated with the user X or the terminal 120X will be referred to as the user information X. Note that user information is information on a user associated with an account used by the user for a predetermined service. The user information includes, but is not limited to, for example, information associated with the user such as a name of the user, an icon image of the user, the age of the user, the gender of the user, an address of the user, a hobby or taste of the user, and an identifier of the user; balance information on an electronic value (e.g., electronic money) associated with the user; and credit card information (e.g., a credit card number) associated with the user.

The user information may be entered by the user or provided by a predetermined service, and may be any one of the above items or a combination of the above items.

The network 130 plays a role in connecting two or more information processing apparatuses 200. The network 130 means a communication network that provides a connection path through which data can be transmitted and received after the terminal 120 has established a connection to the server 110.

One or more portions of the network 130 may be a wired network or a wireless network. The network 130 includes, but is not limited to, for example, an ad hoc network, intranet, extranet, Virtual Private Network (VPN), local area network (LAN), wireless LAN (WLAN), wide area network (WAN), wireless WAN (WWAN), metropolitan network (MAN), part of the Internet, part of a public switched telephone network (PSTN), cellular network, ISDN (Integrated Service Digital Network), Wireless LAN, LTE (Long Term Evolution), CDMA (Code Division Multiple Access), Bluetooth (registered trademark), satellite communication, or any combination of two or more of these. The network 130 may include one or more networks.

The information processing apparatus 200 may be any information processing apparatus as long as being capable of implementing functions and methods described in the present disclosure.

The information processing apparatuses 200 include, but are not limited to, for example, a smartphone, cellular phone (feature phone), computer (including, but not limited to, e.g., a desktop, laptop, tablet, etc.), server device, media computer platform (including, but not limited to, e.g., a cable, satellite set-top box, digital video recorder, etc.), handheld computer device (including, but not limited to, e.g., a PDA (Personal Digital Assistant), e-mail client, etc.), wearable terminal (including, but not limited to, e.g., a glass-type device, watch-type device, etc.), other types of computers and communication platforms.

The external server 140 is, for example, a server associated with a company (an example of a seller) that sells products via electronic commerce. The external server 140 is provided by company by company, and multiple external servers 140 may be connected to the network 130. The external server 140 provides an EC (Electronic Commerce) site to the terminals 120 that access the external server 140.

<Hardware Configuration>

Figure 2:
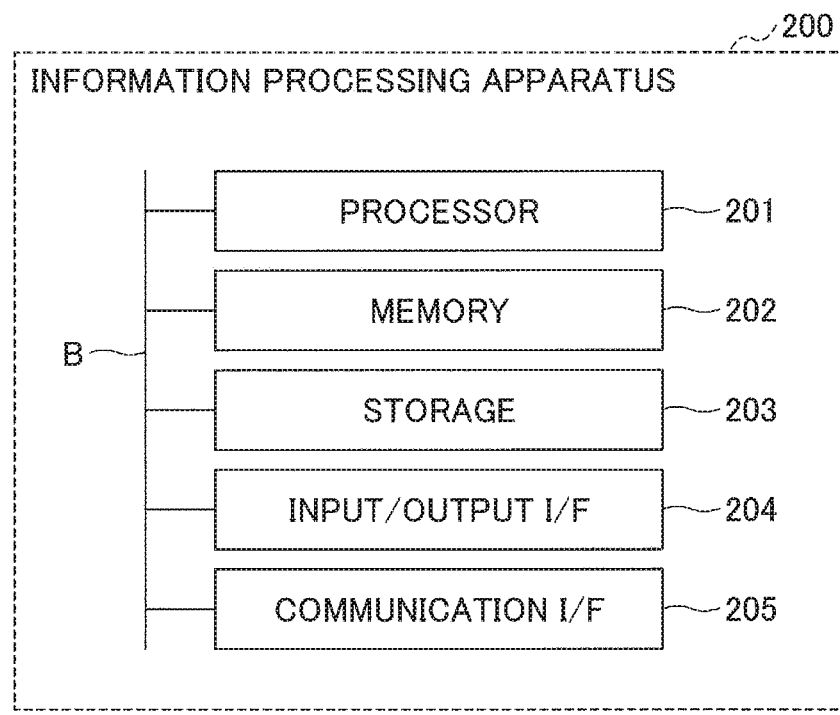
FIG. 2 illustrates an example of a hardware configuration of an information processing apparatus according to the present disclosure.

The hardware configuration of the information processing apparatus 200 included in the communication system 1 will be described with reference to FIG. 2.

The information processing apparatus 200 includes a processor 201, a memory 202, a storage 203, an input/output interface (input/output I/F) 204, and a communication interface (communication I/F) 205. These elements of the information processing apparatus 200 are interconnected via a bus B as a non-limiting example.

The information processing apparatus 200 implements functions and/or methods described in the present disclosure through interoperation among the processor 201, the memory 202, the storage 203, the input/output I/F 204, and the communication I/F 205.

The processor 201 performs functions and methods implemented by codes or instructions included in a program stored in the storage 203. The processor 201 includes, but are not limited to, for example, a central processing unit (CPU), a micro processing unit (MPU), a GPU (Graphics Processing Unit), a microprocessor, a processor core, multiprocessors, an ASIC (Application-Specific Integrated Circuit), an FPGA (Field Programmable Gate Array), and the like. Alternatively, processes disclosed in the embodiments may be implemented by logic circuits (hardware) formed as an integrated circuit (IC) chip, an LSI (Large Scale Integration) chip, or a dedicated circuit. Also, these circuits may be implemented by one or more integrated circuits, and multiple processes illustrated in the embodiments may be implemented by a single integrated circuit. Also, LSI may be referred to as VLSI, super LSI, or ultra LSI, in accordance with different levels of integration.

The memory 202 temporarily stores a program loaded from the storage 203, to provide a working area for the processor 201. Various items of data generated while the processor 201 executes the program are temporarily stored in the memory 202. The memory 202 includes, but is not limited to, for example, a RAM (Random Access Memory), a ROM (Read-Only Memory), and the like.

The storage 203 stores one or more programs. The storage 203 includes, but is not limited to, for example, an HDD (hard disk drive), an SSD (solid state drive), a flash memory, and the like.

The communication I/F 205 transmits and receives various items of data via the network 130. The communication may be performed by wire or wirelessly, and any communication protocol may be used as long as being capable of performing bidirectional communication. The communication I/F 205 has a function to perform communication with another information processing apparatus via the network 130. The communication I/F 205 transmits various items of data to the other information processing apparatus according to instructions from the processor 201. Also, the communication I/F 205 receives various items of data transmitted from the other information processing apparatus and transfers the received data to the processor 201.

The input/output I/F 204 includes an input device for inputting various operations to the information processing apparatus 200 and an output device for outputting results processed by the information processing apparatus 200. The input/output I/F 204 may have the input device and the output device integrated, or may have the input device and the output device separated.

The input device may be implemented by any device among all types of devices that can receive input from a user and transfer information on the input to the processor 201, or by a combination of these devices. The input devices include, but are not limited to, for example, touch panels, touch displays, hardware keys such as a keyboard; pointing devices such as a mouse; cameras (operational input via images); and microphones (operational input via voice).

The output device may be implemented by any device among all types of devices that can output results processed by the processor 201, or by a combination of these devices. In the case of outputting a processed result as a video or moving images, the output device may be implemented by any device among all types of devices that can display data to be displayed according to the data written into a frame buffer, or by a combination of these devices. The output devices include, but are not limited to, for example, touch panels, touch displays, monitors (including, but not limited to, e.g., liquid crystal displays, OELDs (Organic Electroluminescence Displays)), head-mounted displays (HDMs), projection mapping, holograms, devices capable of displaying images, text information, and the like in the air (which may be vacuum), speakers, printers, and the like. Note that these output devices may be capable of displaying display data in 3D.

The programs according to the embodiments in the present disclosure may be provided in a state of being stored in a computer-readable recording medium. Such a recording medium as a "non-transitory tangible medium" can store a program. The programs include, but are not limited to, for example, software programs and computer programs.

The recording media may include, where appropriate, one or more semiconductor-based or other integrated circuits (ICs) (including, but not limited to, e.g., field programmable gate arrays (FPGAs), application-specific ICs (ASICs), etc.), hard disk drives (HDDs), hybrid hard drives (HHDs), optical disks, optical disk drives (ODDs), magneto-optical disks, magneto-optical drives, floppy diskettes, floppy disk drives (FDDs), magnetic tapes, solid-state drives (SSDs), RAM drives, secure digital cards or drives, any other suitable recording media, and suitable combinations of two or more of these. The recording media may be volatile, non-volatile, or a combination of volatile and non-volatile media when appropriate.

Also, a program in the present disclosure may be provided to the information processing apparatus 200 via any transmission medium (such as a communication network or broadcasting wave) capable of transmitting the program.

Also, the embodiments in the present disclosure may also be implemented in a form of data signals embedded in a carrier wave in which a program is embodied by electronic transmission.

Note that programs in the present disclosure may be implemented by using programming languages including, but not limited to, for example, scripting languages such as JavaScript (registered trademark), Python, C language, Go language, Swift, Kotlin, Java (registered trademark), and the like.

At least part of processing in the information processing apparatus 200 may be implemented by cloud computing constituted with one or more computers.

At least part of processing in the information processing apparatus 200 may be configured to be executed on another information processing apparatus. In this case, at least part of processing executed by functional units implemented by the processor 201 may be configured to be executed on the other information processing apparatus.

<Other>

Unless explicitly stated otherwise, in the present disclosure, a determination may not be a requisite, and a predetermined process may be executed when a determination condition is satisfied or a predetermined process may be executed when a determination condition is not satisfied.

In the present disclosure, unless explicitly stated otherwise, or unless indicated otherwise in context, "at least one of A and B" means "A, B, or both". Furthermore, unless explicitly stated otherwise, or unless indicated otherwise in context, "a", "an", or "the" means "one or more". Therefore, in the present specification, unless explicitly stated otherwise, or unless indicated otherwise in context, "an A" or "the A" means "one or more A".

The present disclosure encompasses all changes, substitutions, transformations, modifications, and revisions that may be made by those skilled in the art with respect to the embodiments and application examples in the present disclosure. Also, the attached claims encompass all changes, substitutions, transformations, modifications, and revisions that may be made by those skilled in the art with respect to the embodiments and application examples in the present disclosure. Further, the present disclosure encompasses any combination of one or more features of an embodiment or application example in the present disclosure and one or more features of another embodiment or application example in the present disclosure, which may be made by those skilled in the art.

In addition, references in the attached claims to a device, system, or an element of the device or the system that is adapted, arranged, capable, configurable, usable, operational, or operable to implement a particular function encompass the device, system, or element, regardless of the device, system, element, or particular function being activated, turned on, or unlocked, as long as the device, system, or element is adapted, arranged, capable, configurable, usable, operational, or operable in that way.

Upon implementing any embodiment or application example in the present disclosure, unless explicitly stated otherwise, consent may be obtained from the user in advance or immediately before the implementation. Also, the consent may be obtained comprehensively or on each occasion of implementation.

First Embodiment

The first embodiment provides information representing an address of a user to the external server 140.

The first embodiment brings an effect that at a sales site of products implemented on the external server 140, it is possible to present a delivery charge of a product corresponding to the user without requiring the user to enter the address.

<Functional Configuration of the First Embodiment>

Figure 3:
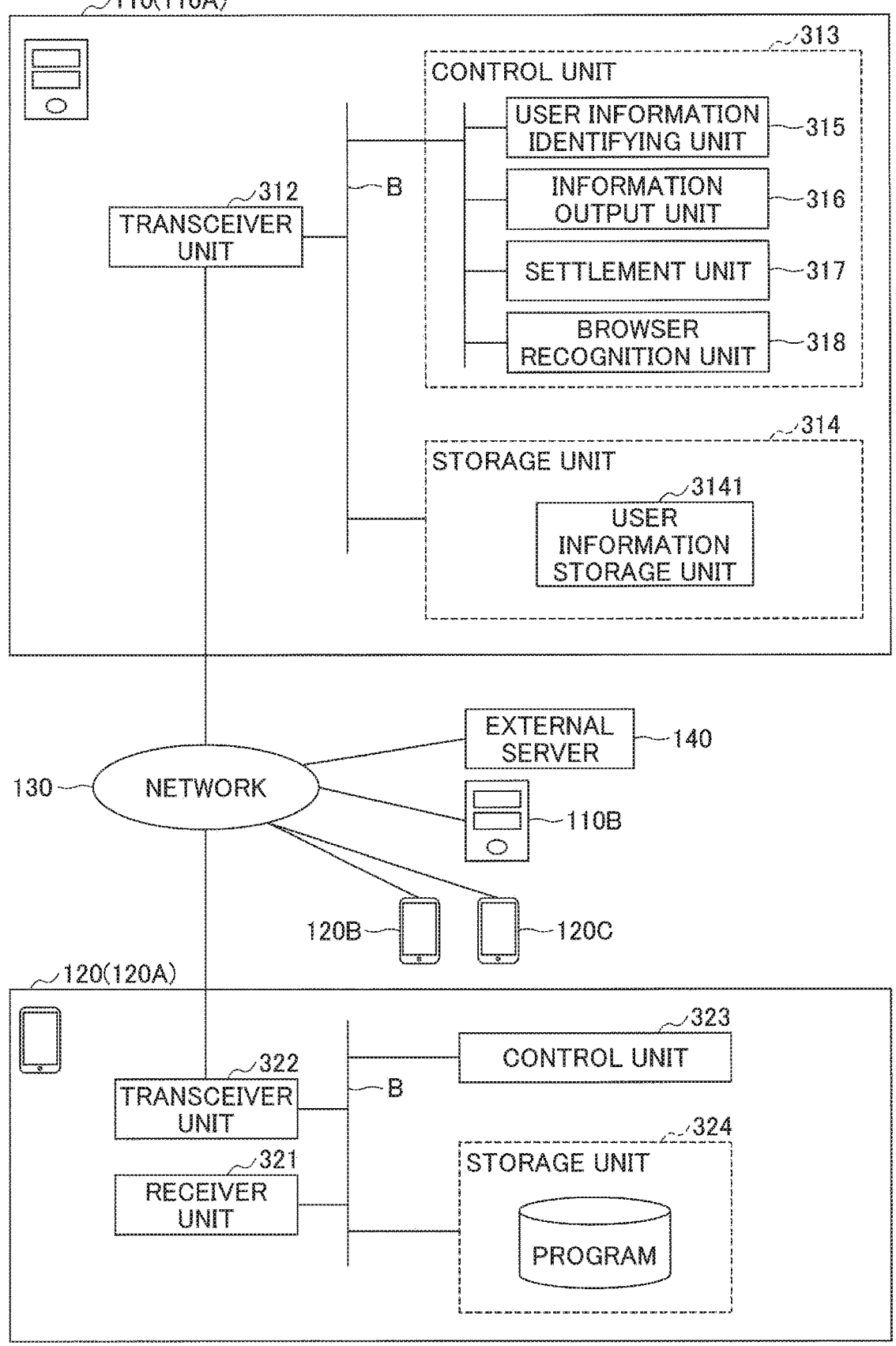
FIG. 3 illustrates an example of a block diagram illustrating a functional configuration of an information processing apparatus according to a first embodiment.

The functional configuration of the server 110 and the terminal 120 will be described with reference to FIG. 3. Functional units disclosed in FIG. 3 may be implemented by interoperation among the processor 201, the memory 202, the storage 203, the input/output I/F 204, and the communication I/F 205 provided in the information processing apparatus 200.

(1) Functional Configuration of the Server

The server 110 includes a transceiver unit 312, a control unit 313, and a storage unit 314. Note that functions or processes of the functional units may be implemented by machine learning or AI (Artificial Intelligence) within a feasible range.

The transceiver unit 312 transmits and receives data to and from the terminal 120 or the like according to a command from the control unit 313. Note that the transceiver unit 312 establishes a session for communication with the terminal 120 using HTTPS or the like when the user of the terminal 120 is authenticated by, for example, a user ID and a password included in a login request from the terminal 120. Then, the communication address of the terminal 120 and the user ID are stored in association with the ID of the established session for communication. Then, the transceiver unit 312 transmits data to the terminal 120 by using the established session for communication.

The control unit 313 performs processing to provide services such as settlement services, financial services, and electronic commerce services to the user of the terminal 120. The control unit 313 will be described in detail later.

The storage unit 314 includes a user information storage unit 3141 to store user information of the terminal 120. The user information storage unit 3141 will be described in detail later. Also, the storage unit 314 stores programs and the like executed on the server 110.

The control unit 313 in the present embodiment includes a user information identifying unit 315, an information output unit 316, a settlement unit 317, and a browser recognition unit 318.

The user information identifying unit 315 identifies user information including a user ID in the storage unit 314, based on the user ID included in a login request from the terminal 120.

The information output unit 316 outputs information representing an address of the user included in the user information identified by the user information identifying unit 315 to the external server 140 via the transceiver unit 312.

The settlement unit 317 performs settlement in response to a request for settlement of a price to be paid from the terminal 120.

The browser recognition unit 318 recognizes a browser that has been activated on the terminal 120 before the request for settlement is made, and after the settlement by the settlement unit 317 has been completed, issues a command to the terminal 120 to perform displaying by the recognized browser.

(2) Functional Configuration of the Terminal

The terminal 120 includes a receiver unit 321, a transceiver unit 322, a control unit 323, and a storage unit 324. Note that functions or processes of the functional units may be implemented by machine learning or AI (Artificial Intelligence) within a feasible range.

The receiver unit 321 receives various operations and the like from the user of the terminal 120.

The transceiver unit 322 transmits and receives data to and from the server 110 or the like according to a command from the control unit 323. Note that the transceiver unit 322 establishes a session for communication with the server 110 using HTTPS or the like when logging in on the server 110. Then, the communication address of the server 110 or the like is stored in association with the ID of the established session for communication. Then, the transceiver unit 322 transmits data to the server 110 by using the established session for communication.

The control unit 323 performs processing to use services provided on the server 110, such as settlement services, financial services, and electronic commerce services.

The storage unit 324 stores programs executed on the terminal 120, and the like.

(3) Example of User Information Storage Unit

In the following, the user information storage unit 3141 in the present embodiment will be described with reference to FIG. 4. FIG. 4 is a diagram illustrating an example of the user information storage unit 3141 of the first embodiment.

The user information storage unit 3141 in the present embodiment stores, as items of information, user IDs, user names, addresses, balances, borrowing limits, settlement histories, settlement methods, attributes, credit levels, and the like. In the user information storage unit 3141, the item "user ID" is associated with the other items.

A value of the item "user ID" represents user identification information for identifying a user of a settlement service provided on the server 110. A value of the item "user name" represents a name of the user. A value of the item "address" represents an address of the user.

Values of the item "balance" represent balances of the amount of money available to the user for settlement. Specifically, the item "balance" is associated with items of "holding balance" and "borrowable balance". A value of the item "holding balance" represents the amount of money that the user has deposited on the server 110. The amount of money that the user has deposited on the server 110 may include, for example, money received for products or the like when the user sells the products or the like using an electronic commerce service provided on the server 110. The amount of money may also include, for example, amounts charged by using banks, credit cards, cash registers, and the like. A value of the item "borrowable balance" represents the amount obtained by subtracting the borrowing amount from the borrowing limit.

A value of the item "borrowing limit" represents the upper limit of the amount of money that the user can borrow from the operator of the server 110, to be used for settlement for a predetermined period of time (e.g., one month). In other words, the borrowing limit represents the upper limit of an amount of settlement that the user can settle by borrowing from the operator of the server 110 within the predetermined period of time.

A value of the item "borrowing amount" represents the total amount of money that the user borrows from the operator of the server 110 for using in settlements for the predetermined period of time. Note that the total amount of borrowed money may be settled monthly or every predetermined period.

A value of the item "points" represents, for example, points given on the server 110 available to the user for payments of prices. Note that one point may be set to be used for payment of one Japanese yen (denoted as JP¥, below).

A value of the item "settlement history" represents a settlement history of the corresponding user. Specifically, a value of the item "settlement history" may include, for example, information that identifies a web site at which the corresponding user made settlement using a settlement service provided on the server 110, or information on products purchased by the user using the settlement service.

A value of the item "settlement method" represents a method of settlement used by the user in a settlement service provided on the server 110. Specifically, settlement methods may include, for example, a method of paying the price by way of a deferred payment service or a method of paying the price by way of a charge payment service.

The deferred payment service is a deferred payment service among the settlement services provided on the server 110; for example, the service may allow a lump-sum amount payment within a predetermined period, such as by the end of the next month, in combination with payments of products purchased through a transaction service provided on the server 110. Also, the upper limit of the amount of money that can be paid by the lump-sum amount payment through the deferred payment service may be equivalent to the borrowing limit.

A charge payment service is a method of depositing money (charging) from a bank, credit card, or cash register at a store to the holding balance to make payment out of the deposited money.

Values of the item "attributes" represent attributes of the user. Specifically, the item of "attributes" is associated with an item "age" and an item "occupation." A value of the item "age" represents the age of the user, and the item "occupation" represents the occupation of the user.

A value of the item "credit level" represents, for example, a value obtained from personal information of the user including a behavioral history and/or a settlement history, where a higher credit level indicates a better user.

In the example in FIG. 4, for example, the user having a user ID of "001" and a user name of "user A" has an address in OO city in XX prefecture, a holding balance of JP¥200, a borrowable balance of JP¥10,000, a borrowing limit of JP¥10,000, a borrowing amount of JP¥0, and 100 points.

In other words, the user A can borrow JP¥10,000; therefore, the amount of money that can be paid by the user A is JP¥10,300 including the 100 points.

<Operational Steps in the First Embodiment>

Figure 5:
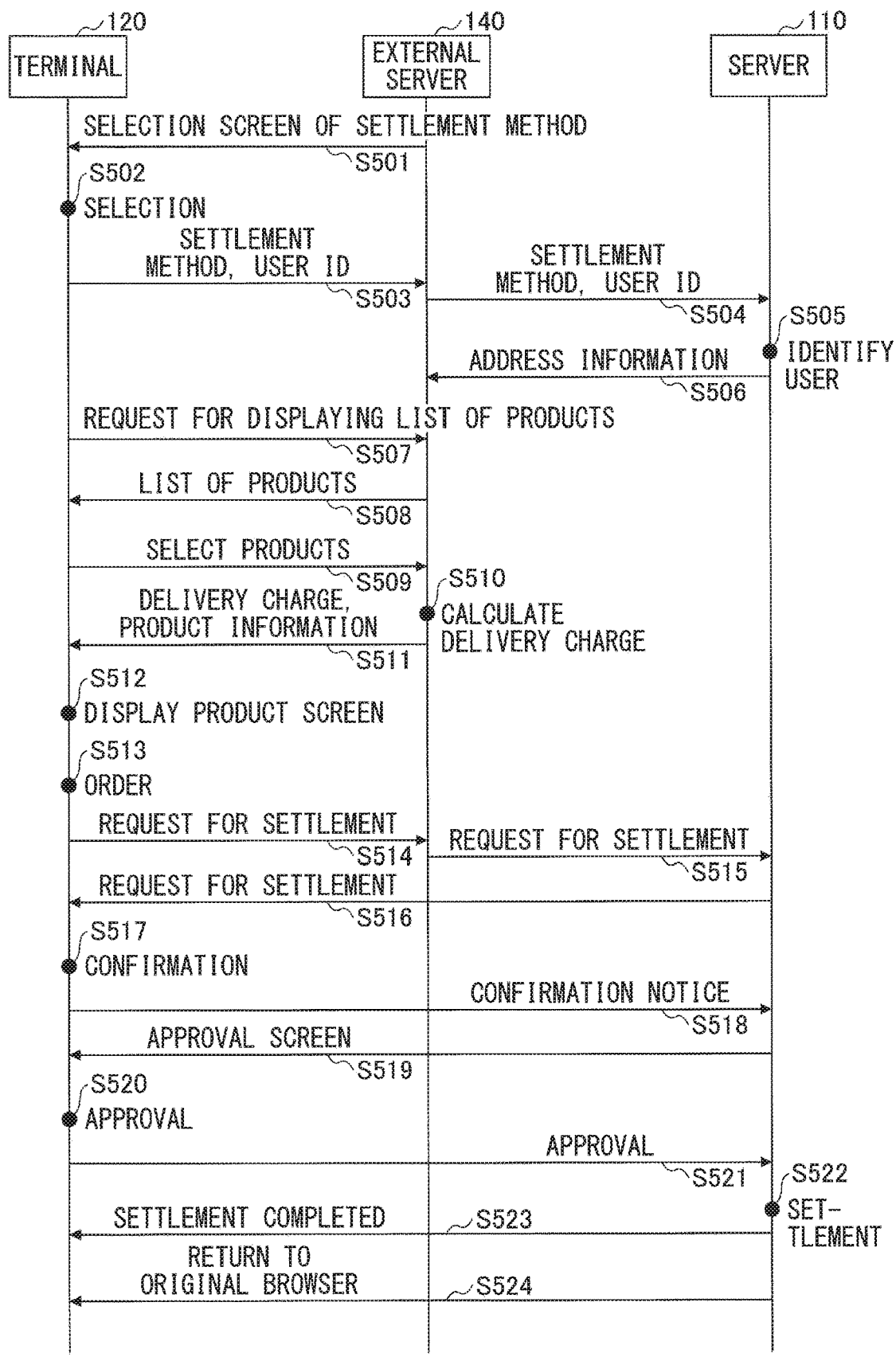
FIG. 5 illustrates an example of a sequence of steps performed in a communication system according to the first embodiment.

With reference to FIG. 5, steps executed in the communication system 1 according to the present embodiment will be described. FIG. 5 illustrates an example of a sequence of steps in the communication system 1 according to the present embodiment.

In the communication system 1, at Step S501, the external server 140 causes the terminal 120 to display a screen for selecting a payment method.

Note that the external server 140 causes the terminal 120 to display an EC site, for example, when the terminal 120 accesses the external server 140. Then, in response to receiving a request for displaying a screen for selecting a settlement method for payment from the terminal 120, the external server 140 may cause the terminal 120 to display the screen for selecting a settlement method.

Once a settlement service provided on the server 110 has been selected at Step S502 as the settlement method on the screen for selecting a settlement method, at Step S503, the terminal 120 transmits, to the external server 140, a notice indicating that the settlement service provided on the server 110 has been selected as the settlement method of paying the price for a product. The terminal 120 may hold a user ID associated with the settlement service provided on the server 110 in advance, and upon transmitting the notice, may transmit the held user ID to the external server 140 with the notice indicating that the settlement method has been selected.

Alternatively, in the present embodiment, in the case where the user ID is not held on the terminal 120, at Step S503, only the notice indicating that the setting method has been selected is sent to the external server 140. In this case, the external server 140 may send this notice to the server 110, and the server 110 may cause the terminal 120 to display a screen for entering the user ID, password, and the like.

In response to receiving the notice and the user ID from the terminal 120, at Step S504, the external server 140 transmits the notice and the user ID to the server 110.

In response to receiving, by the transceiver unit 312, the notice indicating that the settlement method of paying the price of the product has been selected on the server 110 and the user ID, at Step S505, the server 110 causes the user information identifying unit 315 of the control unit 313 to refer to the user information storage unit 3141 so as to identify the user information associated with the received user ID. In other words, the transceiver unit 312 in the present embodiment is an example of a first receiver unit to receive a notice indicating that the settlement method of paying the price of a product on the server 110 has been selected.

Once having identified the user information, next, at Step S506, the server 110 causes the information output unit 316 of the control unit 313 to output the information representing the address of the user that is included in the identified user information, to the external server 140. In the following description, information representing an address of the user will be referred to as address information.

Note that in the case where the credit level included in the user information associated with the user ID is less than or equal to a predetermined value, instead of transmitting the address information, the server 110 may transmit to the terminal 120 a notice indicating that use of the settlement service provided on the server 110 is not permitted, via the external server 140.

In response to receiving a request for displaying a list of products from the terminal 120 at Step S507, at Step S508, the external server 140 causes the terminal 120 to display a screen of the list of products.

Next, once a product has been selected on the terminal 120 at Step S509, at Step S510, the external server 140 calculates the delivery charge of the selected product based on the product information on the selected product and the address information received at Step S506. Then, at Step S511, the external server 140 causes the terminal 120 to display a product screen including the calculated delivery charge and the price of the product.

Note that Steps S507 through S509 are not limited to be executed at this timing, and may be executed before Step S501.

Note that the product information in the present embodiment is information stored in a product database or the like held on the external server 140, which includes, for example, product IDs for identifying respective products, product names, product prices, product description information for explaining the size, weight, use, and the like of each product, and product image data.

Also, the method of calculating a delivery charge may be determined in advance on the external server 140.

For example, the method of calculating a delivery charge may be determined depending on a delivery agent associated with a company associated with the external server 140.

Specifically, for example, delivery charges for respective regions may be determined in advance on the external server 140, which may depend on the volume of each product in a state of being packaged. In this case, the external server 140 simply needs to calculate the delivery charge depending on the volume of the product in the state of being packaged and the address information.

Also, for example, delivery charges for respective regions may be determined in advance on the external server 140, which may depend on the total weight of products to be delivered. In this case, the external server 140 simply needs to calculate the delivery charge depending on the weight and address information of the selected products.

Also, for example, the delivery charge may be set to be free on the external server 140 in the case where the total payment for the prices of products exceeds a certain amount.

Further, for example, in the case where a delivery charge associated with a specific region (such as a remote island) is set in advance on the external server 140, and the area designated by the address information is the specific region, the delivery charge associated with this region may be used as the delivery charge of a product.

At Step S512, the terminal 120 displays a screen of a product in which information on the product and the delivery charge are displayed. In other words, the screen of the product is a screen that includes the product price and the delivery charge. Also, on the screen of the product, the total payment that sums up the product price and the delivery charge may be displayed.

Once a product has been selected on the product screen on the terminal 120, at Step S513, an order confirmation screen for placing an order for the product is displayed. In response to receiving a settlement command on the order confirmation screen, at Step S514, the terminal 120 transmits a request for settlement to the external server 140. At Step S515, the external server 140 transmits the request for settlement to the server 110.

In response to receiving the request for settlement by the transceiver unit 312, at Step S516, the server 110 causes the terminal 120 to display a settlement screen. In other words, the transceiver unit 312 is an example of a second receiver unit to receive a request for settlement.

At this time, the server 110 may display a settlement screen that allows the user to select a method to be used from among multiple settlement methods provided on the server 110. The multiple settlement methods provided on the server 110 may include a method of paying the price out of the holding balance; a method of paying the price using points; a method of paying the price through a deferred payment service; and the like.

At Step S517, an operation indicating that the amount of payment has been confirmed is performed on the terminal 120, and then, at Step S518, the terminal 120 transmits a notice indicating that the amount of payment has been confirmed to the server 110.

In response to receiving this notice, at Step S519, the server 110 causes the terminal 120 to display an approval screen on the terminal 120 for receiving approval of the settlement.

In response to receiving an operation indicating an approval of the settlement on the approval screen at Step S520, at Step S521, the terminal 120 transmits a notice indicating that the settlement has been approved to the server 110.

In response to receiving the notice, at Step S522, the server 110 causes the settlement unit 317 of the control unit 313 to perform settlement of the amount of payment, and when the settlement is completed, at Step S523, transmits a settlement completion notice to the terminal 120. Note that the server 110 may also send a settlement completion notice to the external server 140. Next, at Step S524, the server 110 causes the browser recognition unit 318 of the control unit 313 to recognize the browser that was activated on the terminal 120 immediately before performing the settlement, and causes the recognized browser to display a screen displayed immediately before displaying the settlement screen.

<Display Aspects on the Terminal 120 in the First Embodiment>

Figure 6:
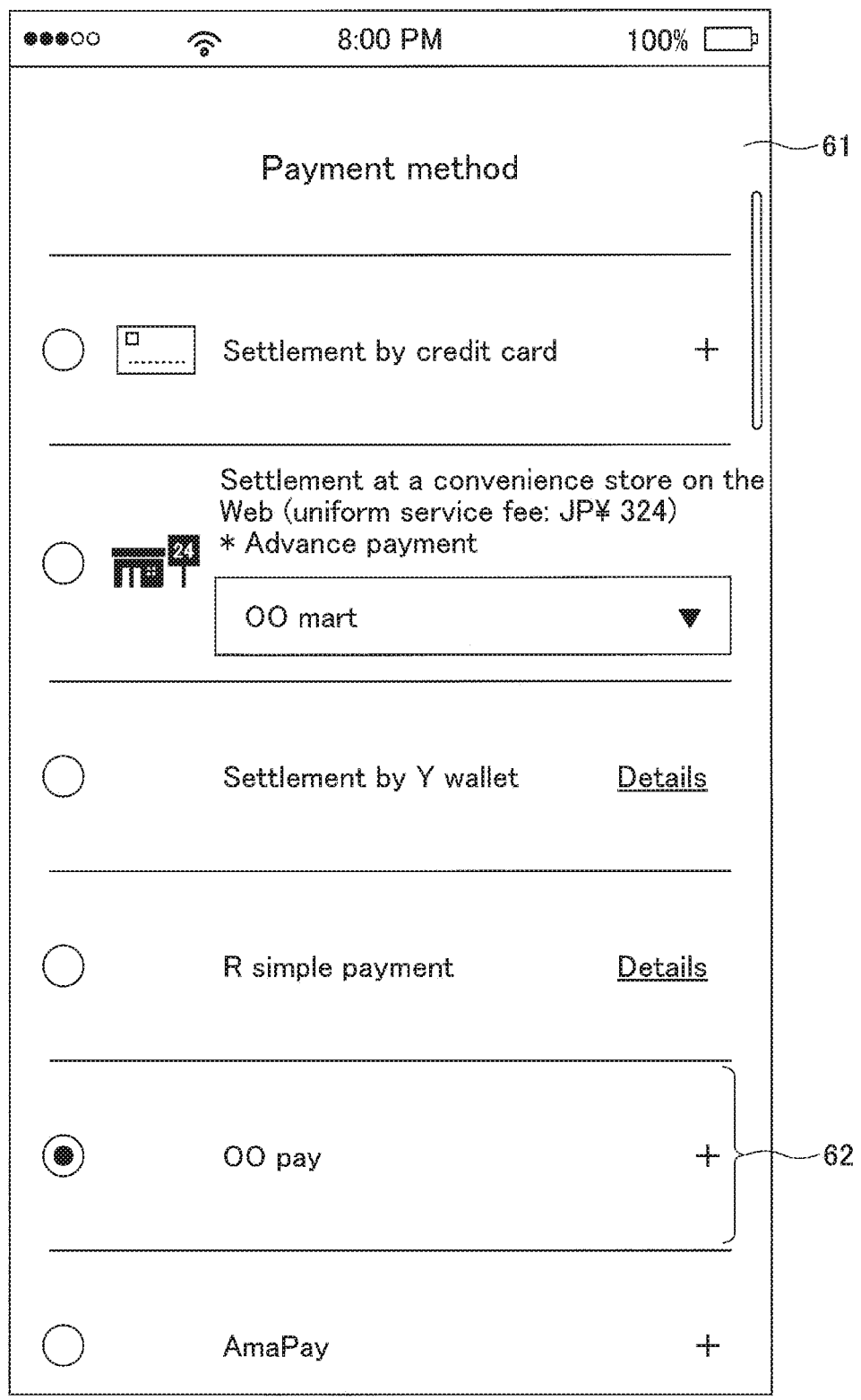
FIG. 6 illustrates an example of a display aspect on a terminal when selecting a settlement method according to the first embodiment.

In the following, display aspects on the terminal 120 will be described with reference to FIGS. 6 to 11. FIG. 6 illustrates an example of a display aspect on the terminal 120 when selecting a settlement method according to the first embodiment.

A screen 61 illustrated in FIG. 6 is an example of a screen for selecting a settlement method displayed on the terminal 120 at Step S501 in FIG. 5.

On the screen 61, a settlement method can be selected from among a list of settlement methods including, in addition to the settlement services provided on the server 110, a settlement method of using a credit card, a settlement method of making payment at a convenience store, and the like. On the screen 61 in FIG. 6, a selection field 62 of one of the settlement services provided on the server 110 is selected.

Figure 7:
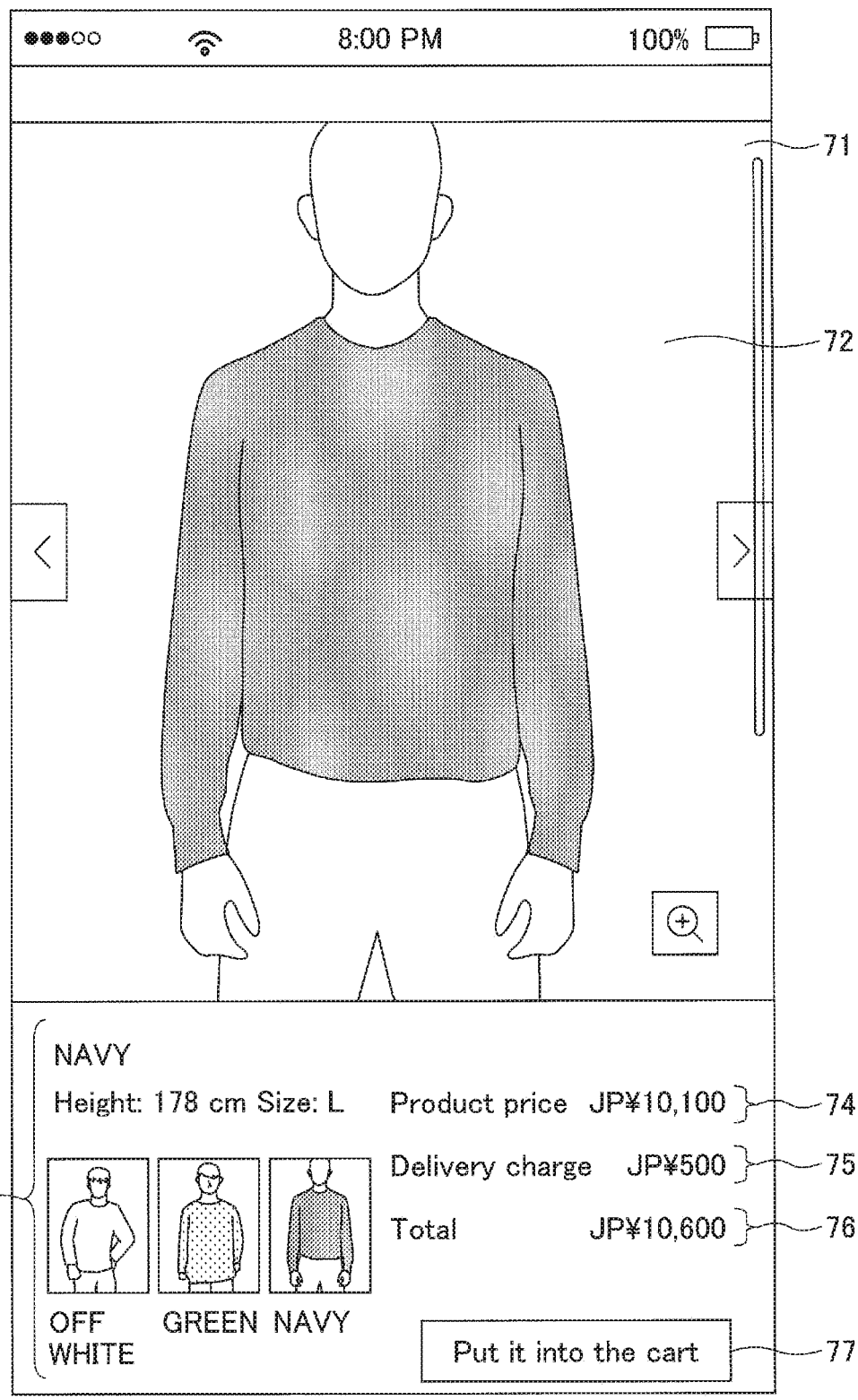
FIG. 7 illustrates an example of a display aspect on a terminal when displaying product information and a delivery charge according to the first embodiment.

FIG. 7 illustrates an example of a display aspect on the terminal 120 when displaying product information and a delivery charge according to the first embodiment. A screen 71 illustrated in FIG. 7 is an example of a product screen displayed at Step S512 in FIG. 5.

On the screen 71, an image of a product is displayed in a display field 72 and a description of the product is displayed in a display field 73. Also, on the screen 71, a display field 74 displays the price of the product (product price), a display field 75 displays the delivery charge of the product upon ordering, and a display field 76 displays the amount of payment, which is the total amount of the product price and the delivery charge. The screen 71 also displays an operational button 77 to be operated when ordering the product.

In the present embodiment, as illustrated with the screen 71, at a stage before ordering a product, the price of the product and the delivery charge to be added when purchasing the product are displayed in association with each other.

Also, the delivery charge is calculated based on the address information of the user output by the external server 140 in response to receiving a notice issued by the server 110 indicating that a settlement service provided on the server 110 has been selected as the settlement method of the product. Therefore, according to the present embodiment, the user does not need to enter the address information into the external server 140 for calculating the delivery charge for product by product.

Thus, in the present embodiment, the user can grasp the amount of payment as the total amount of the price and the delivery charge of the product, before ordering the product and even if the address information is not entered.

Therefore, according to the present embodiment, it is possible to avoid occurrences of events such as, for example, canceling an order of a product or searching for another product with a lower delivery charge, which may occur when the delivery charge turns out to be more expensive than expected by the user after the product has been selected and the address information has been entered. Therefore, according to the present embodiment, user convenience in purchasing products can be improved.

Note that although it is assumed in FIG. 7 that the product price and the delivery charge are displayed on the product screen of the product selected from among the product list, the display aspect is not limited as such. In the communication system 1, for example, when displaying a product list screen on the terminal 120, the delivery charges corresponding to the products may be displayed, respectively, or after ordering multiple products, the delivery charges may be displayed on a page on which the settlement is performed collectively.

Figure 8:
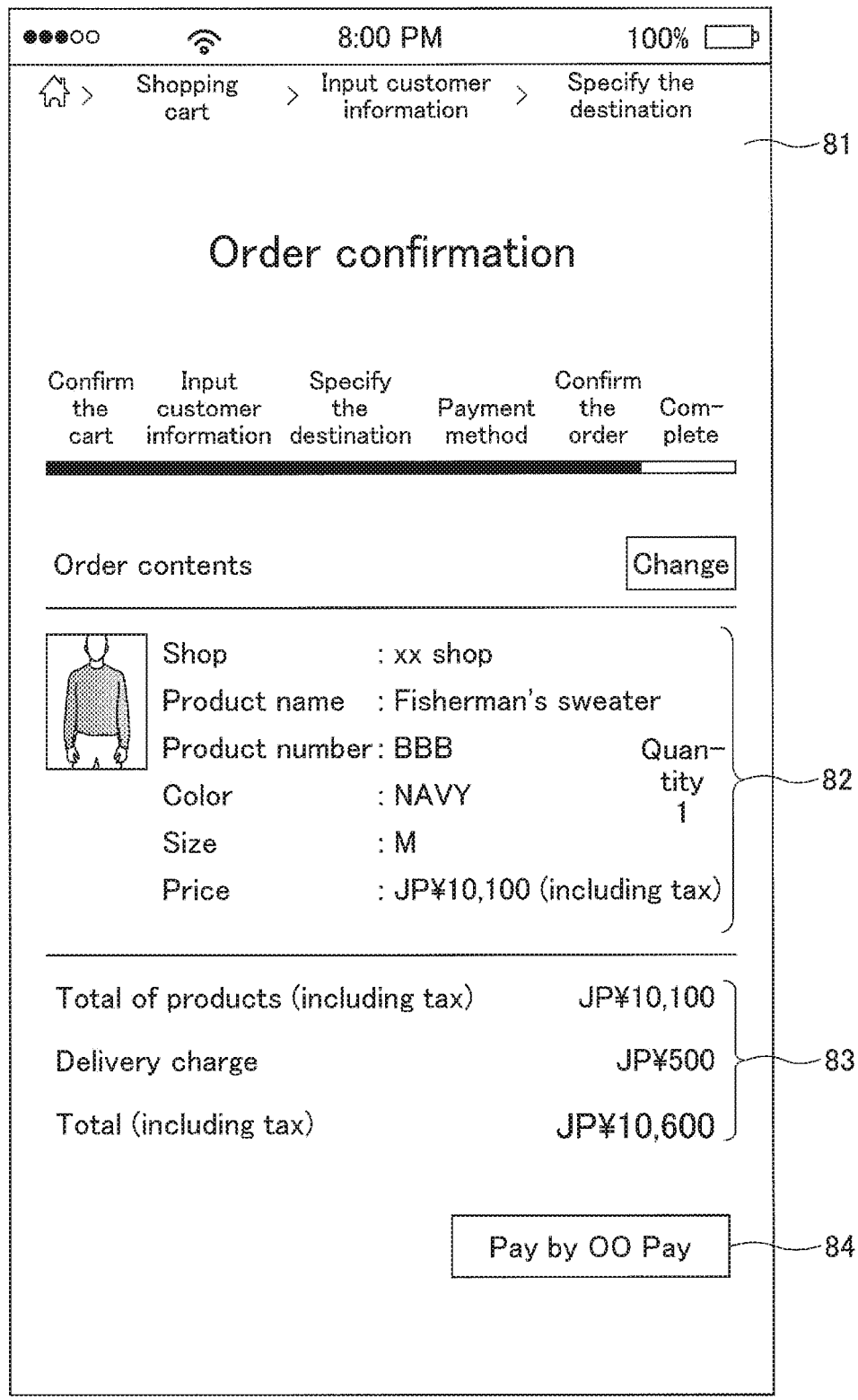
FIG. 8 illustrates an example of a display aspect on a terminal when making a request for settlement according to the first embodiment.

FIG. 8 illustrates an example of a display aspect on the terminal 120 when making a request for settlement according to the first embodiment. A screen 81 illustrated in FIG. 8 is an example of an order confirmation screen displayed at Step S513 in FIG. 5.

On the screen 81, a display field 82 displays information on a product including a description of the product and the product price, and a display field 83 displays the product price, the delivery charge, and the total amount of these.

Also, on the screen 81, an operational button 84 is displayed for finalizing settlement of the amount presented by the total amount.

In response to an operation performed with the operational button 84 on the screen 81, the terminal 120 transmits a request for settlement to the server 110.

Figure 9:
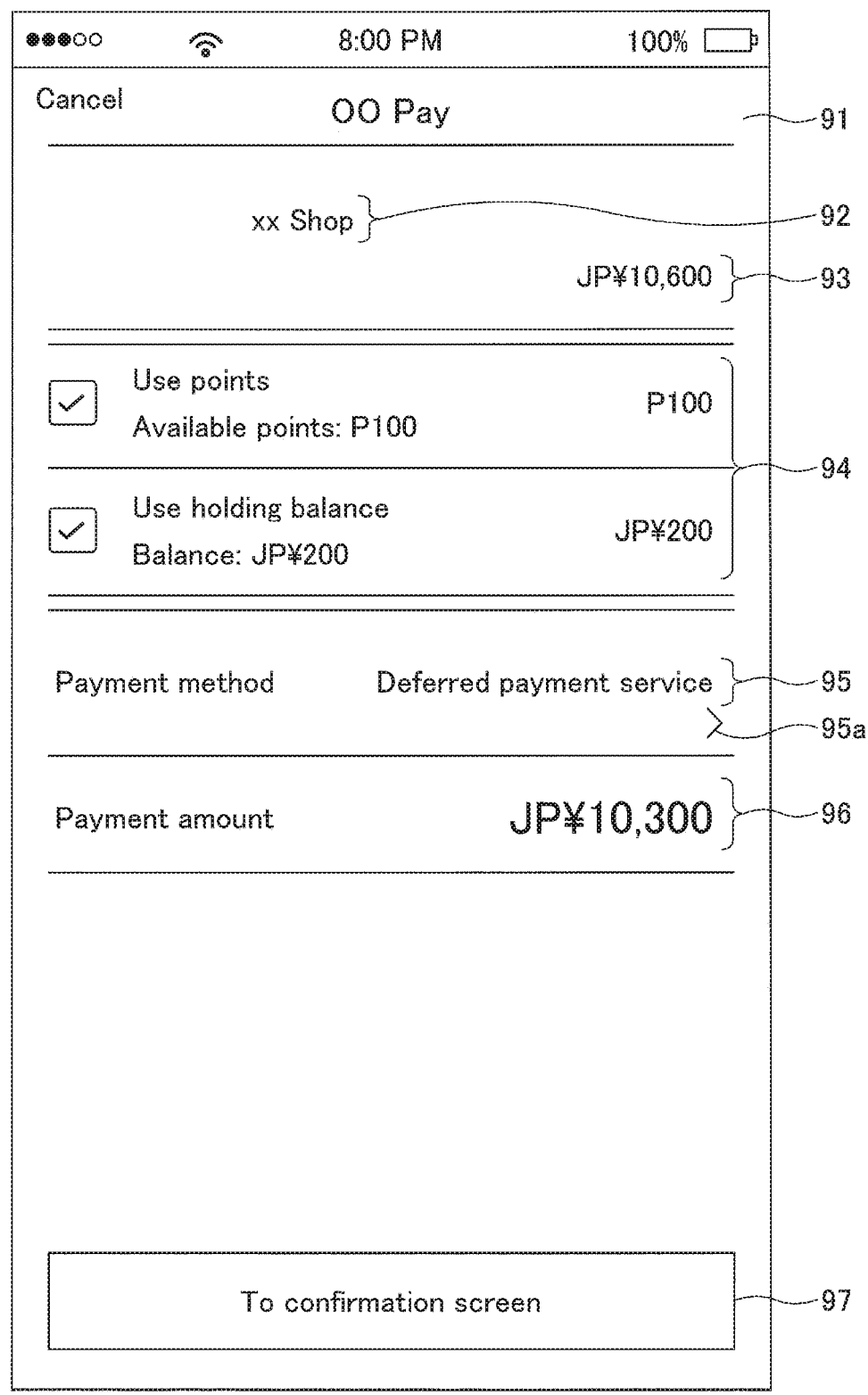
FIG. 9 illustrates an example of a display aspect on a terminal for selecting a settlement method to be used according to the first embodiment.

FIG. 9 illustrates an example of a display aspect on the terminal 120 for selecting a method of settlement to be used according to the first embodiment. A screen 91 illustrated in FIG. 9 is an example of a settlement screen displayed at Step S517 in FIG. 5.

On the settlement screen 91, a display field 92 displays the name of an EC site provided on the external server 140, and a display field 93 displays the total amount of the product price and the delivery charge, namely, the settlement amount.

Also, a display field 94 displays selection fields that allow the user to select whether to use the points and the holding balance, respectively, and a display field 95 displays the selected settlement method. Note that on the screen 91, a list of settlement methods may be displayed in response to an operation performed with an operational part 95$a$ displayed under the display field 95, to display a settlement method selected from among the list in the display field 95. In the example in FIG. 9, a deferred payment service is selected.

Also, the display field 95 may display a settlement method according to priorities determined in advance. Specifically, for example, a settlement method most recently selected by the user may be prioritized when displaying the display field 95.

Alternatively, a settlement method used by other users having attributes similar to the attributes of the user may be prioritized when displaying the display field 95. In this case, the server 110 may refer to the user information storage unit 3141 to identify a user settlement method used by the other users whose attributes match the attributes of the user having the user ID of terminal 120, to display the identified settlement method in the display field 95 on the screen 91. For example, in the case where "occupation" as one of the attributes of the user is "student", a settlement method commonly used by the other users whose attribute is "student" may be prioritized when displaying the display field 95.

Also, the priorities of settlement methods may be set by an operator or the like of the EC site provided on the external server 140; may be set in the order of frequencies of use of settlement methods in the EC site provided on the external server 140; may be changed depending on, for example, the mean amount of settlements or the mean unit price of settlements on the EC site; or may be set based on the settlement amount and the balance of the user. In other words, the priorities of settlement methods may be set depending on the EC site (company) as the payee of the settlement paid by the user.

Specifically, in the case of an EC site where only low-price products are sold, for example, an EC site where the price of all of the products is JP¥100, the priorities of settlement methods may be determined in the order of settlement by points, settlement by the holding balance, settlement by a deferred payment service, and so on. Also, in the case where the priorities of settlement methods are set based on the settlement amount and the balance of the user, and if the settlement amount is JP¥1,000, the priorities may be increased for settlement methods with which settlement can be made for JP¥1,000 or more.

A display field 96 displays the amount of payment calculated based on the points, whether to use the holding balance, and the settlement amount.

In the example in FIG. 9, the settlement amount, which is the total amount of the product price and the delivery charge, is JP¥10,600. Meanwhile, the points possessed by the user are 100 points, and the holding balance is JP¥200, and the user has chosen to use the points and the holding balance.

Therefore, in this case, the amount to be paid by the user is JP¥10,300, which is the amount of money obtained by subtracting JP¥100 corresponding to the points and JP¥200 corresponding to the holding balance from JP¥10,600 as the settlement amount.

Also, in the example in FIG. 9, a deferred payment service is selected as the settlement method. Therefore, the payment of γ10,300 is settled with the deferred payment service.

Also, the screen 91 displays an operational button 97 for transmitting a notice indicating that the content of the order has been confirmed, to the server 110.

On the screen 91, in response to an operation performed on the operational button 97, the terminal 120 transmits a notice indicating that the amount of payment has been confirmed, to the server 110.

Figure 10:
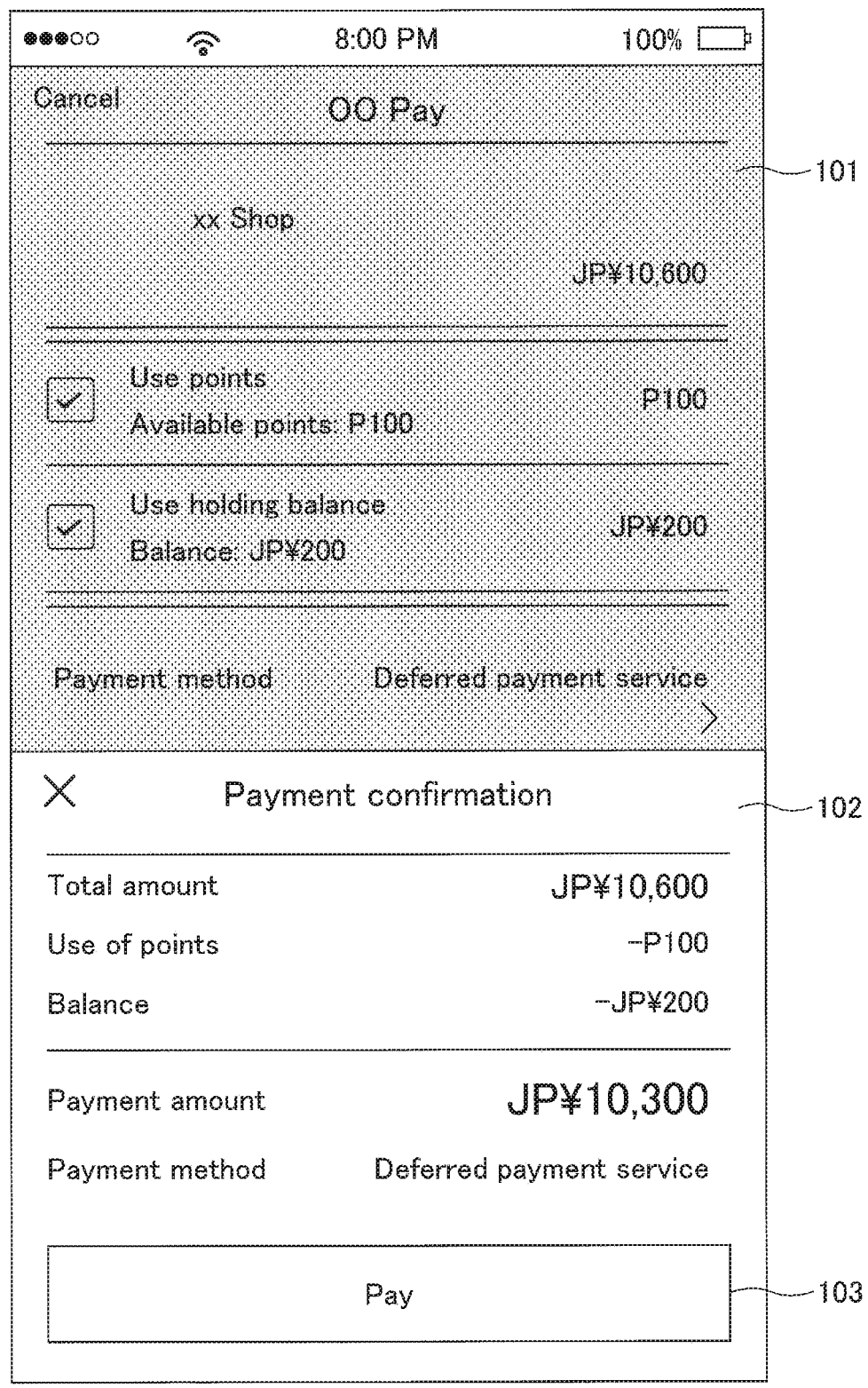
FIG. 10 illustrates an example of a display aspect on a terminal when settlement is to be approved according to the first embodiment.

FIG. 10 illustrates an example of a display aspect on the terminal 120 when settlement is to be approved according to the first embodiment. A screen 101 illustrated in FIG. 10 is an example of an approval screen displayed at Step S519 in FIG. 5.

The screen 101 displays the contents of the settlement in a display field 102. The display field 102 displays the total amount (settlement amount) of the product price and the delivery charge, the points to be used for the payment, the holding balance to be used for the payment, the amount of payment, and the payment method. Also, a display field 102 includes an operational button 103 for transmitting a notice indicating that the settlement is approved for the contents displayed in the display field 102, to the server 110.

In response to an operation performed on the operational button 103, the terminal 120 transmits a notice indicating that the settlement has been approved, to the server 110.

Figure 11:
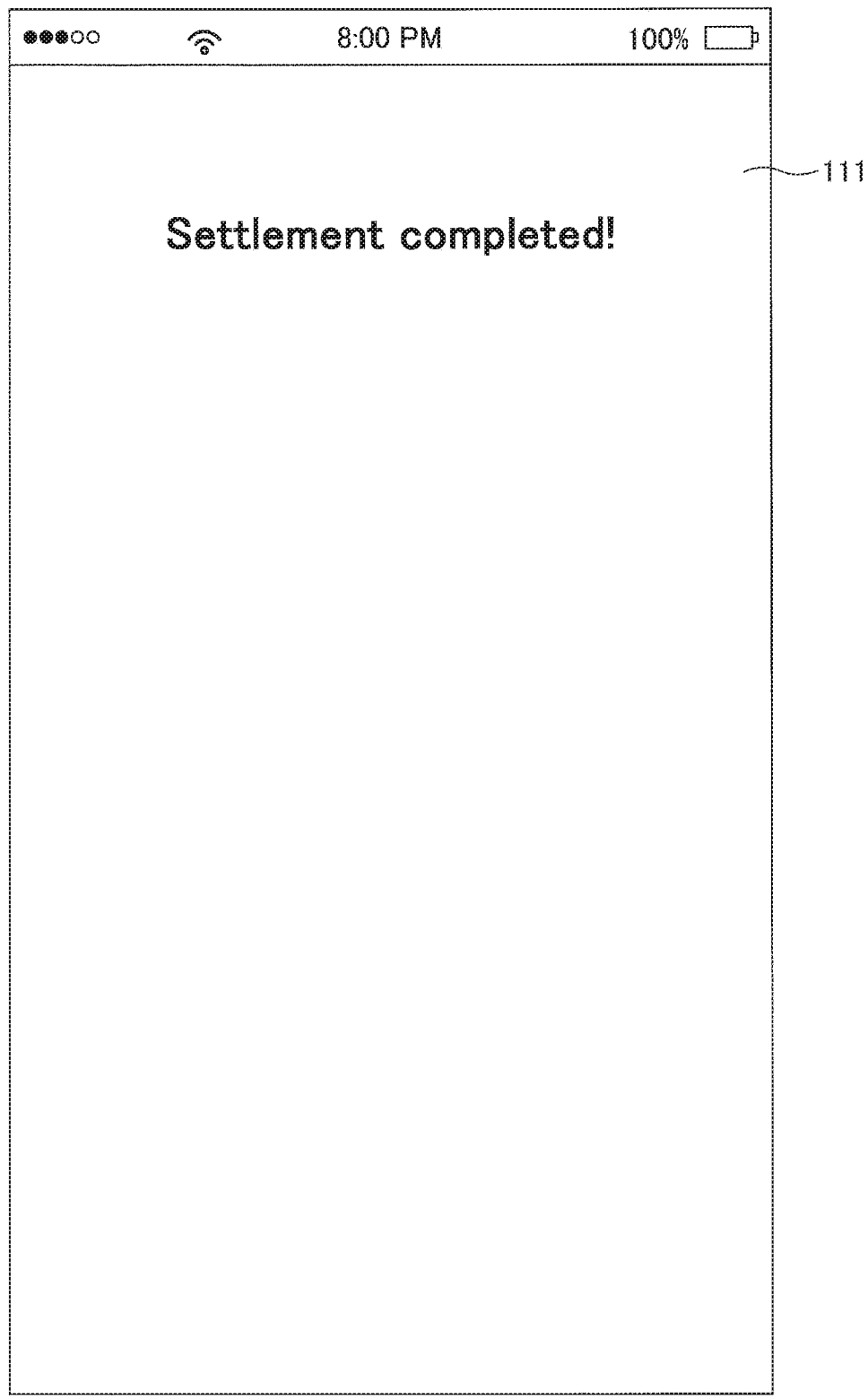
FIG. 11 illustrates an example of a display aspect on a terminal when receiving a notice of settlement completion according to the first embodiment.

FIG. 11 illustrates an example of a display aspect on the terminal 120 when receiving a notice of settlement completion according to the first embodiment. A screen 111 illustrated in FIG. 11 is an example of a screen displayed on the terminal 120 when a notice of completion of the settlement is received at Step S523 in FIG. 5.

After causing the terminal 120 to display the screen 111, the server 110 causes the browser recognition unit 318 to recognize the browser on the terminal 120 displayed on the screen of the EC site before the screen 91, and causes the recognized browser to display, for example, the product screen 71 illustrated in FIG. 7.

In this way, the server 110 recognizes the browser that was activated on the terminal 120, and upon completion of the settlement, issues a notice to this browser that the settlement has been completed. Therefore, according to the present embodiment, after the settlement has been completed, it is possible to return to the screen displayed before the settlement, without activating a browser different from the browser used before the settlement.

First Application Example

The first application example is an application example in which a delivery charge of a product is calculated on the server 110 and the delivery charge is transmitted to the external server 140.

<<Effects of the First Application Example>>

According to the first application example, calculating the delivery charge on the server 110 enables to present the delivery charge of a product corresponding to the user without calculating the delivery charge on the external server 140. Also, the address information is not transmitted to the outside; therefore, the user can advance the delivery procedure without disclosing the address to the company operating the external server 140. Also, an effect is obtained that companies operating respective external servers 140 do not need to design calculation of their own delivery charges.

Functional Configuration of the First Application Example

Figure 12:
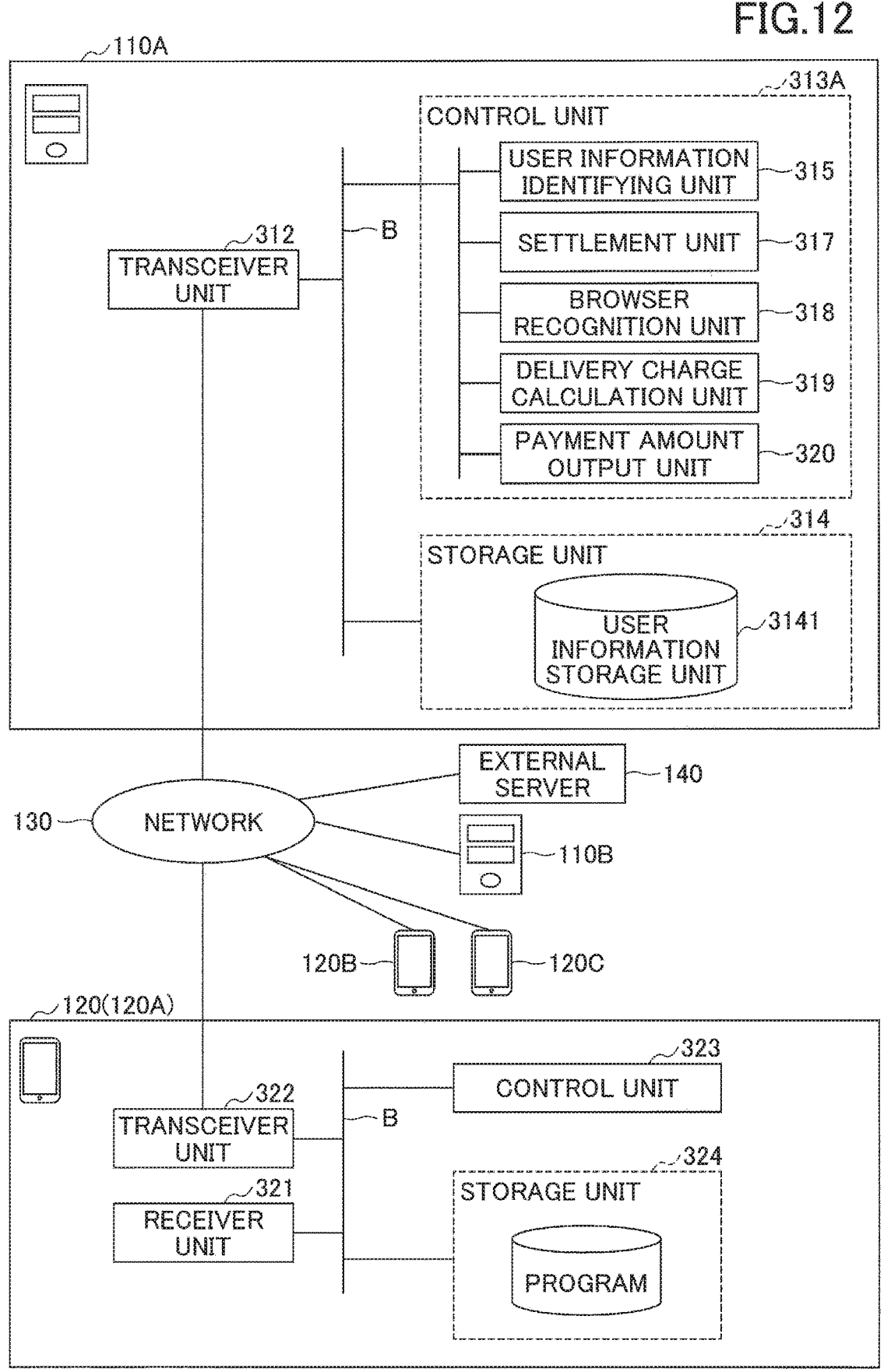
FIG. 12 illustrates a functional configuration of a server and a terminal according to a second application example.

A functional configuration of a server 110A and a terminal 120 will be described with reference to FIG. 12. FIG. 12 illustrates a functional configuration of the server 110A and the terminal 120 of the first application example. Functional units disclosed in FIG. 12 are implemented by interoperation among a processor 201, a memory 202, a storage 203, an input/output I/F 204, and a communication I/F 205 provided in an information processing apparatus 200.

(1) Functional Configuration of the Server

The server 110A includes a transceiver unit 312, a control unit 313A, and a storage unit 314. Note that functions or processes of the functional units may be implemented by machine learning or AI (Artificial Intelligence) within a feasible range.

In the following description, elements having the same functions as described in the first embodiment are given the same reference codes as used in the description of the first embodiment, and the description is omitted.

The control unit 313A in the present application example includes a user information identifying unit 315, a delivery charge calculation unit 319, a payment amount output unit 320, a settlement unit 317, and a browser recognition unit 318.

In response to receiving product information from an external server 140, the delivery charge calculation unit 319 calculates the delivery charge of the product based on the address information of the user included in the user information identified by the user information identifying unit 315 and the product information. The payment amount output unit 320 outputs the amount of payment, which is the total amount of the calculated delivery charge and the price of the product included in the product information, to the external server 140 via the transceiver unit 312.

(2) Functional Configuration of the Terminal

The functional configuration of the terminal 120 is substantially the same as that of the terminal 120 described in the first embodiment, and hence, the description is omitted.

<<Operational Steps in the First Application Example>>

Figure 13:
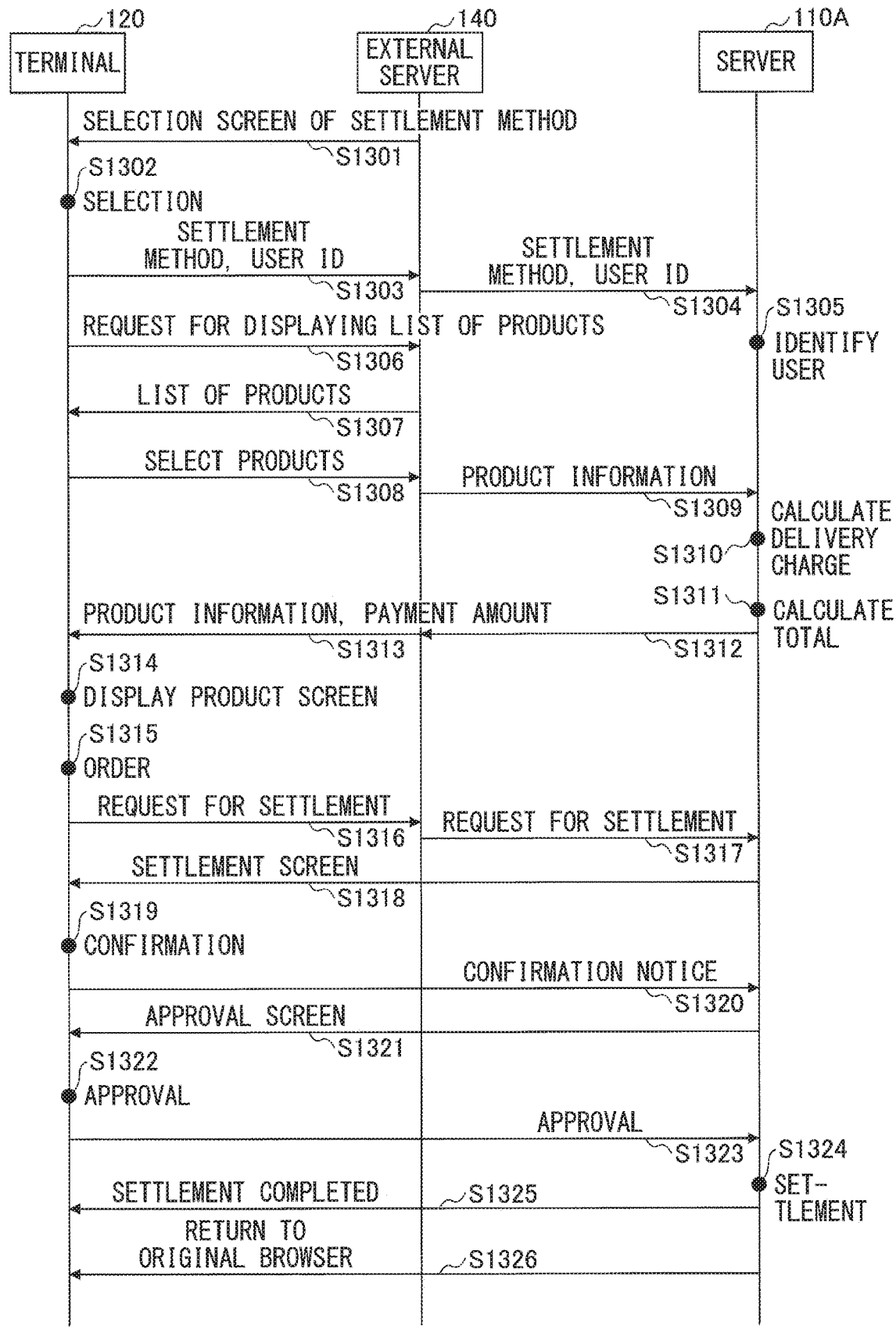
FIG. 13 illustrates an example of a sequence of steps of a communication system according to the second application example.

With reference to FIG. 13, steps executed in the communication system 1 according to the first application example will be described. FIG. 13 illustrates an example of a sequence of steps in the communication system 1 according to the first application example.

A process from Step S1301 to Step S1305 in FIG. 13 is substantially the same as the process from Step S501 to Step S505 in FIG. 5, and hence, the description is omitted.

In response to receiving a request for displaying a list of products from the terminal 120 at Step S1306, at Step S1307, the external server 140 causes the terminal 120 to display a screen of a list of products. Next, once a product has been selected on the terminal 120 at Step S1308, the external server 140 transmits the product information on the selected product to the server 110A at Step S1309. Note that at this time, the product information may include information representing an address of the sender of the product being sold on the EC site provided on the external server 140. The address of the sender of the product may be, for example, the location of a warehouse at which the product is stored.

At Step S1310, in response to receiving the product information, the server 110A causes the delivery charge calculation unit 319 to calculate the delivery charge of the product based on the product price included in the product information and the address information included in the identified user information.

Next, at Step S1311, the server 110A causes the payment amount output unit 320 to calculate the amount of payment, which is the total amount of the calculated delivery charge and the product price, and at Step S1312, transmits the amount of payment to the external server 140. Note that the server 110A may transmit only the delivery charge calculated by the delivery charge calculation unit 319 to the external server 140, to determine the amount of payment as the total amount of the delivery charge and the price of the product on the external server 140.

Also, at this time, the server 110A may refer to the user information storage unit 3141 to extract the number of users whose settlement histories include information representing the product identified by the received product information, so as to transmit the number of users to the external server 140. In other words, the server 110A extracts the number of users who have purchased the same product as the product selected on the terminal 120 by using a settlement service provided on the server 110A, so as to transmit the number of users to the external server 140.

Also, the server 110A may obtain the number of other terminals 120 on which the product selected on the terminal 120 was selected, and transmits the number to the external server 140. In other words, the server 110A may extract the number of the other users who have selected the same product as the product selected on the terminal 120, and transmits the number to an external server 140. A process of extracting the number of users may be implemented by machine learning or AI processing.

In response to receiving the amount of payment, at Step S1313, the external server 140 causes the terminal 120 to display a product screen including the product information and the amount of payment. At this time, the external server 140 causes the terminal 120 to display a product screen including the product price, the delivery charge, and the amount of payment.

The external server 140 may also cause the terminal 120 to display the number of users who have purchased the same product as that selected on the terminal 120 on the product screen.

Further, in the case where the number of the other users who select the same product as the product selected on the terminal 120 is greater than or equal to a predetermined number, the external server 140 may discount the product price of the product, to display the discounted product price on the product screen.

A process from Step S1314 to Step S1326 in FIG. 13 is substantially the same as the process from Step S512 to Step S524 in FIG. 5, and hence, the description is omitted.

In the present application example, upon completion of the settlement of the product, the server 110A may transmit the address information included in the user information identified at Step S1305 in a two-dimensional code to the external server 140.

In the present embodiment, for example, at Step S1302, the terminal 120 may make a request for a setting to transmit the address information in a two-dimensional code to the external server 140. This setting request is transmitted to the server 110A along with the settlement method and the user ID.

If this setting has been made, the server 110A may increase the delivery charge calculated by the delivery charge calculation unit 319 by a certain amount.

On the EC site side, when delivering the product to the user, the two-dimensional code including the address information of the user may be printed on the delivery slip. In this case, the delivery agent may scan this two-dimensional code to obtain the address information of the user.

In this way, by having the server 110A output the address information of the user to the external server 140 as a two-dimensional code or the like, it becomes possible for the user to purchase a product from an EC site without disclosing the address or name as the personal information to the EC site.

Second Embodiment

The second embodiment sets the upper limit of the amount of money that can be paid with a deferred payment service, depending on the credit level of an EC site.

The second embodiment brings an effect that an appropriate upper limit of the amount of settlement can be set.

<Functional Configuration of the Second Embodiment>

Figure 14:
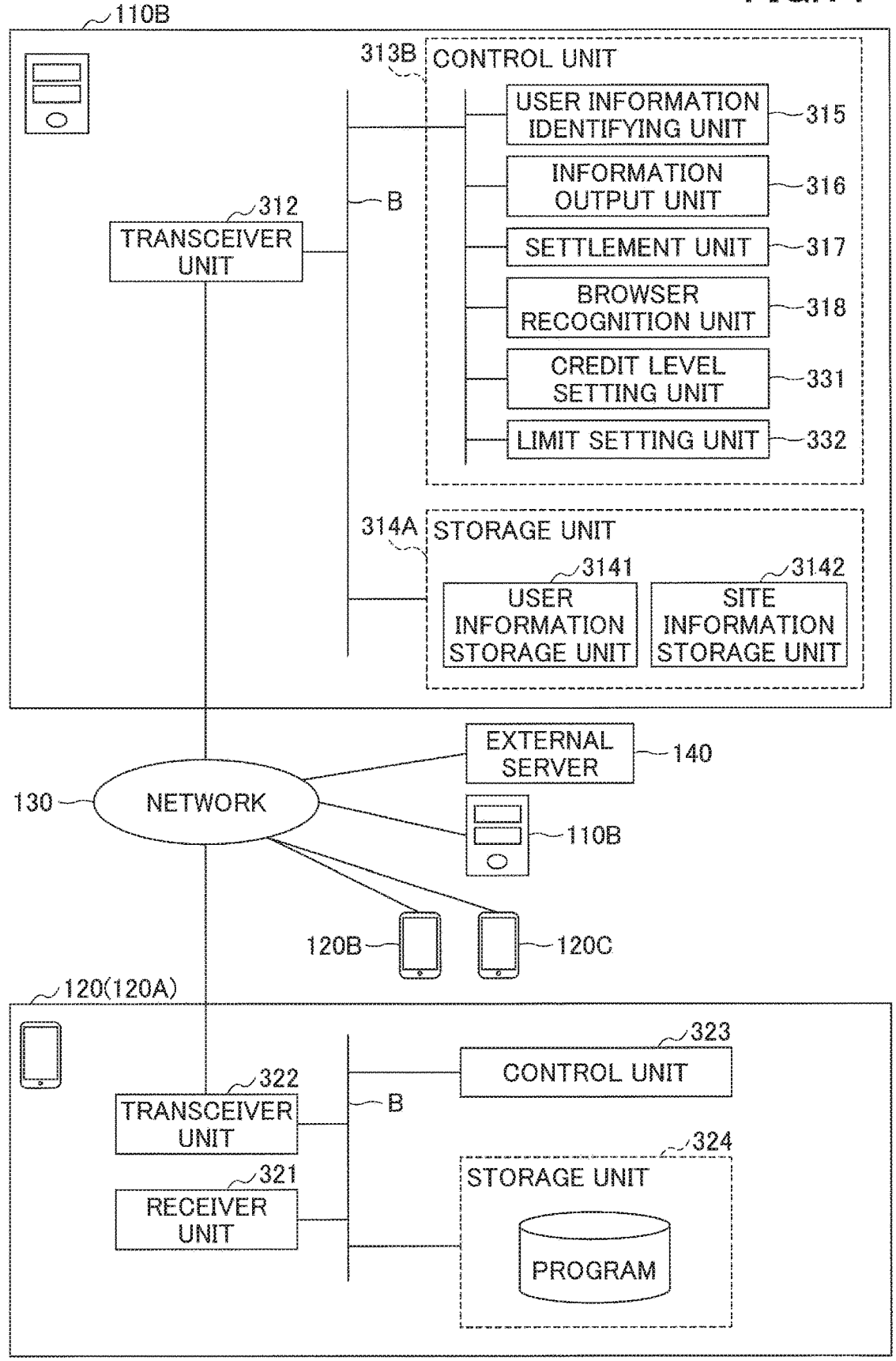
FIG. 14 illustrates a functional configuration of a server and a terminal according to a second embodiment.

A functional configuration of a server 110B and a terminal 120 will be described with reference to FIG. 14. FIG. 14 illustrates a functional configuration of the server 110B and the terminal 120 according to the second embodiment. Functional units disclosed in FIG. 14 are implemented by interoperation among a processor 201, a memory 202, the storage 203, the input/output I/F 204, and the communication I/F 205 provided by the information processing apparatus 200.

(1) Functional Configuration of the Server

The server 110B includes a transceiver unit 312, a control unit 313B, and a storage unit 314A. Note that functions or processes of the functional units may be implemented by machine learning or AI (Artificial Intelligence) within a feasible range.

In the following description, elements having the same functions as described in the first embodiment are given the same reference codes as used in the description of the first embodiment, and the description is omitted.

The control unit 313B in the present embodiment includes a user information identifying unit 315, an information output unit 316, a settlement unit 317, a browser recognition unit 318, a credit level setting unit 331, and a limit setting unit 332. The storage unit 314A includes a user information storage unit 3141 and a site information storage unit 3142 to store site information representing information on EC sites. The site information storage unit 3142 will be described in detail later.

The credit level setting unit 331 in the present embodiment calculates and sets the credit level for each EC site included in the site information. The credit level setting unit 331 in the present embodiment may also calculate and set the credit levels of users.

The limit setting unit 332 in the present embodiment calculates and sets a borrowing limit of each user based on the credit level of the user included in the user information and the credit level of each EC site included in the site information. A borrowing limit of the user is, for example, an upper limit of the amount of money that can be paid in a lump sum with a deferred service among settlement services provided on the server 110B.

(2) Functional Configuration of the Terminal

The functional configuration of terminal 120 is substantially the same as the terminal 120 described in the first embodiment, and hence, the description is omitted.

(3) Example of the Site Information Storage Unit

In the following, the site information storage unit 3142 in the present embodiment will be described with reference to FIG. 15. FIG. 15 is a diagram illustrating an example of the site information storage unit 3142 according to the second embodiment.

The site information storage unit 3142 in the present embodiment includes, as items of information, site IDs, URLs, mean amounts of settlements, mean values, maximum values, minimum values, median values of product prices, and credit levels.

A value of the item "site ID" represents identification information for identifying an EC site. A value of the item "URL" represents a URL of the EC site. Note that the URL for the EC site may be used as the site ID.

A value of the item "mean amount of settlements" represents a mean value of settlement amounts at the EC site. A value of the item "mean value of product price" represents a mean value of prices of products carried by the EC site; a value of the item "maximum value" represents the highest price among the prices of the products carried by the EC site; and a value of the item "minimum value" represents the lowest price among the prices of the products carried by the EC site. A value of the item "median" value represents the median value of the prices of the products carried by the EC site.

A value of the item "credit level" represents a credit level of the EC site. The credit level of an EC site is a value that may be determined according to credit levels of the users who purchase products at the EC site; the number of complaints submitted to the EC site; the types and prices of products carried by the EC site; the number of transactions at the EC site for a predetermined period of time; the period of operation of the EC site; and the like. A higher value of the credit level of an EC site indicates that the EC site has a higher social credibility.

The credit level setting unit 331 in the present embodiment may lower the credit level of an EC site, for example, in the case where among users who purchased products at the EC site, users whose credit level is lower than a predetermined value occupy a certain proportion or greater; or may increase the credit level of the EC site in the case where users whose credit level is higher than a predetermined value occupy a certain proportion or greater.

Also, the credit level setting unit 331 may lower the credit level of an EC site, for example, at which users who have selected deferred payment services as the settlement method; yet have balances in bank accounts and the like below the borrowing limits; and did not make lump-sum payments, occupy a certain proportion or greater. The credit level setting unit 331 may also lower the credit level of a user who did not make a lump-sum payment.

Meanwhile, the credit level setting unit 331 may raise the credit level, for example, for an EC site that has a mean amount of settlements greater than or equal to a certain amount, and/or for an EC site that has a mean value of product prices greater than or equal to a predetermined amount. Further, the credit level setting unit 331 may lower the credit level of such an EC site in the case where the rating among the users who purchased products at this site is less than or equal to a certain value.

Also, the credit level setting unit 331 may lower the credit level of a user, for example, who frequently purchases products from EC sites whose credit levels are less than or equal to a predetermined value. Also, the credit level setting unit 331 may raise the credit level of a user whose mean amount of settlements is greater than or equal to a certain amount.

<Steps of Setting Borrowing Limit in the Second Embodiment>

In the following, steps executed by the limit setting unit 332 of the server 110B in the present embodiment will be described with reference to FIG. 16. FIG. 16 illustrates a flow chart of steps of setting a borrowing limit according to the second embodiment. The steps in FIG. 16 may be performed regularly on the server 110B or may be performed every time a user purchases a product by using a settlement service provided on the server 110B.

On the server 110B, at Step S1601, the limit setting unit 332 refers to the user information storage unit 3141, to obtain the credit level of a user whose borrowing limit is to be set. Next, at Step S1602, the limit setting unit 332 refers to the user information storage unit 3141, to identify EC sites at which the user has made settlements from the settlement history or the like of the user whose borrowing limit is to be set. In other words, the limit setting unit 332 identifies EC sites to which the user has made payments for the settlements. Next, at Step S1603, the limit setting unit 332 refers to the user information storage unit 3141 to identify the current borrowing limit of the user.

Next, at Step S1604, the limit setting unit 332 refers to the site information storage unit 3142, to obtain the credit levels of the identified EC sites, so as to increase or decrease the borrowing limit of the user according to the credit level of the user and the credit levels of the sites. Note that at Step S1604, the borrowing limit of the user does not need to be increased or decreased.

In other words, the limit setting unit 332 in the present embodiment includes a function of an identifying unit to identify EC sites to which the user has made payments for settlements, and a function of a setting unit to set the borrowing limit of the user.

The limit setting unit 332 may set a borrowing limit uniformly among the users. In this case, the limit setting unit 332 may calculate a borrowing limit to be uniformly set for the users, depending on a mean value of the credit levels of all EC sites included in the site information storage unit 3142.

Alternatively, the limit setting unit 332 may set a borrowing limit for each user. In this case, the borrowing limit of each user may be calculated based on the credit level of the user and the credit levels of EC sites included in the settlement history of the user.

For example, assume that a user A whose borrowing limit is set to JP¥10,000 and a user B whose borrowing limit is set to JP¥20,000 have purchased products at an EC site having a mean amount of settlements of JP¥2,000.

In this case, for example, the borrowing limits of the users A and B may be increased by N yen, or the borrowing limits of the users A and B may be increased by N %, respectively.

Also, for example, in the case where the mean amount of settlements at an EC site where the users A and B frequently purchase products is JP¥12,000, the limit setting unit 332 may increase only the borrowing limit of the user A by JP¥2,000 to JP¥12,000.

Also, assume that the credit level of an EC site at which the users A and B have purchased products multiple times in the past is greater than or equal to a certain value; the EC site has a mean amount of settlements of JP¥30,000; and the credit levels of the users A and B are also greater than or equal to a certain value. In this case, the limit setting unit 332 may uniformly set the borrowing limits of the users A and B to an amount greater than or equal to JP¥30,000.

In this way, according to the present embodiment, site information on EC sites is taken into consideration to set a borrowing limit of a user; therefore, it is possible to set an appropriate borrowing limit.

Note that in the present embodiment, although the settlement limit is defined as the upper limit of the amount of money that the user can borrow (borrowing limit) from the operator of the server 110B for a predetermined period of time (e.g., one month) to be used for settlements, and this settlement limit is set depending on the credit level of the EC site, the setting is not limited as such.

In the present embodiment, for example, an upper limit that can be settled by a settlement service provided on the server 110B may be set as the settlement limit, and the settlement limit may be set depending on the credit level of the EC site, in substantially the same way as described above. Also in this case, the settlement limit may be set for each user, or it may be set uniformly for all users. Further, the settlement limit may be set for each EC site.

Also, the limit setting unit 332 in the present embodiment may refer to the user information storage unit 3141, to set the settlement limit of a user depending on the settlement amount of the user at the EC site. For example, the limit setting unit 332 may increase the settlement limit for a user who has a history of settlements including an amount greater than or equal to the mean amount of settlements at a highly credible EC site having a credit level above a certain value.

Also, the limit setting unit 332 may set a settlement limit of a user at an EC site, for example, depending on the frequency of settlements made by the user by using settlement services provided on the server 110B. Specifically, for example, the limit setting unit 332 may set the settlement limit of a user having a higher frequency of settlements to be higher than the settlement limit of another user having a lower frequency of settlements. Such a setting allows, for example, a higher settlement limit to be set for a user who uses the settlement service on a weekly basis than for a user who uses the settlement service on a predetermined period basis (e.g., monthly).

Also, the limit setting unit 332 in the present embodiment may determine whether to provide the settlement service to the operator of an EC site, depending on the credit level of the EC site. For example, the limit setting unit 332 may transmit a notice to the user or the operator of the EC site that the settlement service provided on the server 110B is unavailable if the credit level of the EC site is less than or equal to a predetermined value.

Setting the settlement limit this way enables the setting of an appropriate settlement limit depending on the credit level of an EC site.

In connection with the above description, the following notes are further disclosed.

(Note 1)

An information processing method executed by an information processing apparatus, the method including:

receiving a notice indicating that a settlement method for payment of a price of a product has been selected, the settlement method being available on the information processing apparatus;

transmitting information on delivery of the product; and receiving a request for settlement of an amount of money determined based on the information on delivery of the product and information including the price of the product.

(Note 2)

The information processing method as described in Note 1, wherein the receiving of the notice receives the notice indicating that the settlement method for payment of the price of the product has been selected, and user identification information of a user who has selected the settlement method, and wherein the transmitting transmits, as the information related to delivery of the product, address information stored in association with the identification information of the user to another information processing apparatus associated with a seller selling the product.

(Note 3)

The information processing method as described in Note 1, wherein the receiving of the notice receives the notice indicating that the settlement method for payment of the price of the product has been selected, user identification information of a user who has selected the settlement method, and product information including the price of the product, and wherein the transmitting transmits, as the information related to delivery of the product, a delivery charge of the product calculated based on address information stored in association with the identification information of the user to another information processing apparatus associated with a seller selling the product.

(Note 4)

The information processing method as described in Note 3, the method further including:

calculating an amount of payment based on the delivery charge of the product and the price of the product; and including the amount of payment in the information related to the delivery of the product.

(Note 5)

The information processing method as described in Note 3 or 4, the method further including:

transmitting, in a case where a number of users who have selected the product is greater than or equal to a predetermined number, a notice indicating that the number of users who have selected the product, and a command to discount the price of the product, to said another information processing apparatus.

(Note 6)

The information processing method as described in any one of Notes 1 to 5, wherein priorities are set for the settlement method and other available settlement methods, respectively, the method further including:

causing, in response to receiving the request for settlement, a first information processing apparatus associated with the user to display one or more of the settlement methods depending on the priorities.

(Note 7)

The information processing method as described in Note 6, wherein the priorities are set depending on a seller to which the settlement is to be made by the user.

(Note 8)

The information processing method as described in any one of Notes 1 to 7, the method further including:

recognizing a browser that displayed information on the product, and transmitting, after the settlement made in response to the request for settlement has been completed, a command to cause the recognized browser to display information on the product.

(Note 9)

An information processing apparatus, including:

a first receiver unit configured to receive a notice indicating that a settlement method for payment of a price of a product has been selected, the settlement method being available on the information processing apparatus;

a transmitter unit configured to transmit information on delivery of the product; and a second receiver unit configured to receive a request for settlement of an amount of money determined based on the information on delivery of the product and information including the price of the product.

(Note 10)

A non-transitory computer-readable recording medium having a program stored thereon for causing an information processing apparatus to execute a method, the method including:

receiving a notice indicating that a settlement method for payment of a price of a product has been selected, the settlement method being available on the information processing apparatus;

transmitting information on delivery of the product; and receiving a request for settlement of an amount of money determined based on the information on delivery of the product and information including the price of the product.

(Note 11)

A non-transitory computer-readable recording medium having a program stored thereon for causing an information processing apparatus to execute a method, the method including:

receiving from a first information processing apparatus a notice indicating that a settlement method for payment of a price of a product has been selected, to transmit the notice to another information processing apparatus to perform the settlement by the selected settlement method;

receiving information on delivery of the product from said another information processing apparatus; and causing the first information processing apparatus to display a screen including a delivery charge of the product obtained based on the information on delivery of the product, and a price of the product.

(Note 12)

An information processing method executed by an information processing apparatus, the method including:

identifying a seller to which a settlement of payment is to be made by a user; and setting an upper limit of an amount of settlement of the user depending on a credit level of the identified seller.

(Note 13)

The information processing method as described in Note 12, the method further including:

changing the credit level of the seller depending on credit levels of users who made payments to the seller.

(Note 14)

The information processing method as described in Note 12 or 13, the method further including:

setting the credit level of the seller, by using at least one of a mean value of settlements with respect to the seller; and a mean value, a median value, a maximum value, and a minimum value of prices of products carried by the seller.

(Note 15)

The information processing method as described in any one of Notes 12 to 14, wherein the upper limit of the amount of settlement of the user is a borrowing limit allowed for the user upon borrowing from an operator of the information processing apparatus, for settlements for a predetermined period of time.

(Note 16)

The information processing method as described in any one of Notes 12 to 15, wherein the setting of the upper limit changes the upper limit of the amount of settlement of the user, based on a total amount of settlements made by the user with respect to the seller.

(Note 17)

The information processing method as described in any one of Notes 12 to 16, wherein the setting of the upper limit changes the upper limit of the amount of settlement of the user, based on a frequency of settlements made by the user with respect to the seller.

(Note 18)

The information processing method as described in Note 12, wherein the users who made payments to the seller are two or more users.

(Note 19)

The information processing method as described in Note 13, wherein the users who made payments to the seller are two or more users having similar attributes to each other.

(Note 20)

The information processing method as described in any one of Notes 12 to 19, the method further including:

transmitting, in a case where the credit level of the identified seller is less than or equal to a predetermined level, a notice indicating that the settlement cannot be made with the seller to another information processing terminal used by the user.

(Note 21)

An information processing apparatus, including:

an identifying unit configured to identify a seller to which a user makes a payment for settlement, and a setting unit configured to set an upper limit of an amount of settlement of the user depending on a credit level of the identified seller.

(Note 22)

A non-transitory computer-readable recording medium having a program stored thereon for causing an information processing apparatus to execute a method, the method including:

identifying a seller to which a user makes a payment for settlement, and setting an upper limit of an amount of settlement of the user depending on a credit level of the identified seller.

The invention claimed is:

1. An information processing method executed by one or more processors included in an information processing apparatus comprising a memory coupled to the one or more processors, the method comprising:

implementing a machine-learning process via a browser recognition unit (BRU) configured to recognize a browser that accesses a website, to determine whether the browser has been activated on a terminal of a user, and to produce a result as a browser identification, without requiring input from the user;

obtaining a notice indicating that a deferred payment has been selected for a settlement of a price of a product on the web site;

identifying a seller to which the settlement is to be made;

receiving a request for settlement on an amount of money determined based on information including information on delivery of the product and information on the price of the product;

receiving input from the user indicating acceptance of the request for the settlement; and advancing the settlement in a case where the amount of money is less than or equal to an upper limit of an amount of settlement using the deferred payment allowed for the user, responsive to the acceptance and to the browser identification, without requiring additional input from the user other than the acceptance.

2. The information processing method as claimed in claim 1, the method further comprising:

adjusting the upper limit of the amount of settlement using the deferred payment, depending on the seller.

3. The information processing method as claimed in claim 1, the method further comprising:

changing the upper limit of the amount of settlement of the user, based on a total amount of settlements made by the user with respect to the seller.

4. The information processing method as claimed in claim 1, the method further comprising:

changing the upper limit of the amount of settlement of the user, based on a frequency of settlements made by the user with respect to the seller.

5. The information processing method as claimed in claim 1, the method further comprising:

transmitting, as information related to delivery of the product, address information stored in association with identification information of the user to another information processing apparatus associated with the seller.

6. The information processing method as claimed in claim 1, the method further comprising:
causing, in response to receiving the request for settlement, a first information processing apparatus associated with the user to display a settlement method depending on priority of the settlement method.

7. The information processing method as claimed in claim 6, wherein the priority is set depending on the seller.

8. The information processing method as claimed in claim 1, the method further comprising:
transmitting, in a case where a credit level of the seller is less than or equal to a predetermined level, a notice indicating that the settlement cannot be made with the seller to an information processing terminal used by the user.

9. The information processing method as claimed in claim 1, the method further comprising:
changing a credit level of the seller depending on credit levels of one or more users who made payments to the seller.

10. The information processing method as claimed in claim 1, the method further comprising:
setting a credit level of the seller, by using at least one of a mean value of settlements with respect to the seller; and a mean value, a median value, a maximum value, and a minimum value of prices of products carried by the seller.

11. An information processing apparatus comprising:
a memory coupled to one or more processors configured to execute operations comprising:
a browser recognition unit (BRU) implementing a machine-learning process to recognize a browser that accesses a website, to determine whether the browser has been activated on a terminal of a user, and to produce a result as a browser identification, without requiring input from the user;
obtaining a notice indicating that a deferred payment has been selected for a settlement of a price of a product on the web site;
identifying a seller to which the settlement is to be made;
receiving a request for settlement on an amount of money determined based on information including information on delivery of the product and information on the price of the product;
receiving input from the user indicating acceptance of the request for the settlement; and
advancing the settlement in a case where the amount of money is less than or equal to an upper limit of an amount of settlement using the deferred payment allowed for the user, responsive to the acceptance and to the browser identification, without requiring additional input from the user other than the acceptance.

12. A non-transitory computer-readable recording medium having a program stored thereon for causing one or more processors included in an information processing apparatus to execute a method, the method comprising:
implementing a machine-learning process via a browser recognition unit (BRU) configured to recognize a browser that accesses a website, to determine whether the browser has been activated on a terminal of a user, and to produce a result as a browser identification, without requiring input from the user;
obtaining a notice indicating that a deferred payment has been selected for a settlement of a price of a product on the web site;
identifying a seller to which the settlement is to be made;
receiving a request for settlement on an amount of money determined based on information including information on delivery of the product and information on the price of the product;
receiving input from the user indicating acceptance of the request for the settlement; and
advancing the settlement in a case where the amount of money is less than or equal to an upper limit of an amount of settlement using the deferred payment allowed for the user, responsive to the acceptance and to the browser identification, without requiring additional input from the user other than the acceptance.

\* \* \* \* \*

UNITED STATES PATENT AND TRADEMARK OFFICE
CERTIFICATE OF CORRECTION

| | |
|---|---|
| PATENT NO. | : 11,263,616 B2 |
| APPLICATION NO. | : 16/700278 |
| DATED | : March 1, 2022 |
| INVENTOR(S) | : Tada et al. |

It is certified that error appears in the above-identified patent and that said Letters Patent is hereby corrected as shown below:

In the Claims

In Column 24, Claim 1, Line 34, delete "web site;" and insert -- website; --, therefor.

In Column 25, Claim 11, Line 39, delete "web site;" and insert -- website; --, therefor.

In Column 26, Claim 12, Line 25, delete "web site;" and insert -- website; --, therefor.

Signed and Sealed this
Tenth Day of May, 2022

*Katherine Kelly Vidal*
Katherine Kelly Vidal
*Director of the United States Patent and Trademark Office*